US012525722B2

(12) United States Patent
Ranjbarnikkhah et al.

(10) Patent No.: US 12,525,722 B2
(45) Date of Patent: Jan. 13, 2026

(54) ACTIVE METASURFACES

(71) Applicant: Kymeta Corporation, Redmond, WA (US)

(72) Inventors: Mohammad Ranjbarnikkhah, Redmond, WA (US); Mohammad Mahdi Honari Kalateh, Redmond, WA (US); Mohsen Sazegar, Redmond, WA (US)

(73) Assignee: KYMETA CORPORATION, Redmond, WA (US)

(*) Notice: Subject to any disclaimer, the term of this patent is extended or adjusted under 35 U.S.C. 154(b) by 41 days.

(21) Appl. No.: 18/605,089

(22) Filed: Mar. 14, 2024

(65) Prior Publication Data

US 2024/0313412 A1 Sep. 19, 2024

Related U.S. Application Data

(60) Provisional application No. 63/525,773, filed on Jul. 10, 2023, provisional application No. 63/452,846, filed on Mar. 17, 2023.

(51) Int. Cl.

| | |
|---|---|
| ***H01Q 13/10*** | (2006.01) |
| ***H01Q 1/22*** | (2006.01) |
| ***H01Q 13/18*** | (2006.01) |
| ***H01Q 23/00*** | (2006.01) |

(52) U.S. Cl.

CPC ......... *H01Q 13/103* (2013.01); *H01Q 1/2283* (2013.01); *H01Q 13/18* (2013.01); *H01Q 23/00* (2013.01)

(58) Field of Classification Search

CPC ...... H01Q 13/103; H01Q 13/18; H01Q 13/10; H01Q 1/2283; H01Q 23/00; H01Q 15/0086; H01Q 3/44; H01Q 21/064; H01Q 21/20

See application file for complete search history.

(56) References Cited

U.S. PATENT DOCUMENTS

| | | | | |
|---|---|---|---|---|
| 2014/0300521 | A1 | 10/2014 | Jünemann | |
| 2017/0170572 | A1* | 6/2017 | Severson | H01Q 21/064 |
| 2017/0302004 | A1* | 10/2017 | Stevenson | H01Q 21/065 |
| 2018/0366831 | A1 | 12/2018 | Cai et al. | |
| 2020/0083605 | A1* | 3/2020 | Quarfoth | H01Q 13/206 |
| 2021/0050671 | A1* | 2/2021 | Stevenson | H01Q 21/0087 |

(Continued)

FOREIGN PATENT DOCUMENTS

| | | | | |
|---|---|---|---|---|
| EP | 4379952 | A1 * | 6/2024 | H01Q 21/064 |
| WO | 2022/018397 | A1 | 1/2022 | |

OTHER PUBLICATIONS

International Search Report and Written Opinion received for PCT Patent Application No. PCT/IB2024/052558, mailed on Jun. 14, 2024, 8 pages.

(Continued)

*Primary Examiner* — Seokjin Kim

(74) *Attorney, Agent, or Firm* — Womble Bond Dickinson (US) LLP

(57) ABSTRACT

Active metasurface antennas and methods for using the same are disclosed. In some embodiments, the metasurface has a plurality of tunable radiating antenna elements, and each tunable radiating antenna element of the tunable radiating antenna elements comprises a tuning element configured to tune each tunable radiating antenna element and an amplifier coupled in parallel to the tuning element.

15 Claims, 15 Drawing Sheets

(56) References Cited

U.S. PATENT DOCUMENTS

| | | | | |
|---|---|---|---|---|
| 2021/0258069 | A1 | 8/2021 | Sazegar et al. | |
| 2021/0313705 | A1* | 10/2021 | Linn | H01Q 21/065 |
| 2021/0351512 | A1* | 11/2021 | Varel | H01Q 13/10 |
| 2022/0278449 | A1* | 9/2022 | Sazegar | H01Q 15/0066 |
| 2022/0320753 | A1* | 10/2022 | Sazegar | H01Q 21/0012 |
| 2022/0399651 | A1* | 12/2022 | Sleasman | H01Q 3/2658 |
| 2023/0360935 | A1* | 11/2023 | Linn, III | H01Q 21/0087 |

OTHER PUBLICATIONS

International Preliminary Report on Patentability received for PCT application No. PCT/IB2024/052558, mailed on Oct. 2, 2025, 7 pages.

* cited by examiner

ACTIVE METASURFACES

RELATED APPLICATION

The present application is a non-provisional application of and claims the benefit of U.S. Provisional Patent Application No. 63/452,846, filed Mar. 17, 2023, and entitled "Folded Iris Active Metasurfaces", and U.S. Provisional Patent Application No. 63/525,773, filed Jul. 10, 2023, and entitled "High-Performance Active Metasurfaces," which are incorporated by reference in its entirety.

FIELD OF THE DISCLOSURE

Embodiments of the present disclosure are related to wireless communication; more particularly, embodiments disclosed herein related to active metasurface antennas.

BACKGROUND

Metasurface antennas have recently emerged as another example of an electronically steerable antenna for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

In some electronically steerable antennas, the radiating antenna elements include tuning elements to control their operation. These tuning elements can be non-linear devices that tune the antenna elements as part of the process for generating beams with the antenna elements.

SUMMARY

Active metasurface antennas and methods for using the same are disclosed. In some embodiments, the metasurface has a plurality of tunable radiating antenna elements, and each tunable radiating antenna element of the tunable radiating antenna elements comprises: a gap, a pair of conductors positioned in the gap, a transistor coupled to the pair of conductors, a tuning element configured to tune said each tunable radiating antenna element, a capacitor coupled in series with the tuning element, and an amplifier coupled in parallel to the tuning element and the capacitor, wherein first terminals of the tuning element and amplifier are coupled to a first terminal of the transistor and the capacitor and an output terminal of the amplifier are coupled to a second terminal of the transistor.

In some other embodiments, the antenna comprises a metasurface having radiating antenna elements and amplifiers configured to amplify signals for the radiating antenna elements. In some embodiments, for each of the radiating antenna elements, the metasurface includes: an antenna element; at least one of: a low noise amplifier (LNA) coupled to the patch antenna and configured to amplify signals after reception by the patch antenna for said each radiating antenna element, and a power amplifier (PA) coupled to the patch antenna and configured to amplify signals for transmission from the one radiating antenna element by the patch antenna; a tunable coupler coupled to the patch antenna using a wire cage. The coupler includes a tunable slot to couple a feed wave to said each radiating antenna element, and a tuning element coupled to the tunable slot to tune said tunable slot.

In yet some other embodiments, the antenna comprises a metasurface having a plurality of radiating antenna elements. In some embodiments, each of the plurality of radiating antenna elements comprises: a cavity-backed antenna; at least one of: a low noise amplifier (LNA) coupled to the cavity-backed antenna and configured to amplify signals after reception by the cavity-backed antenna for said each radiating antenna element, and a power amplifier (PA) coupled to the cavity-backed antenna and configured to amplify signals for transmission from the one radiating antenna element by the cavity-backed antenna; and a tunable coupler coupled to the cavity-backed antenna using a first wire cage having a first plurality of vias. The coupler can include a tunable slot to couple a feed wave to said each radiating antenna, element, and a tuning element coupled to the tunable slot to tune the tunable slot.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
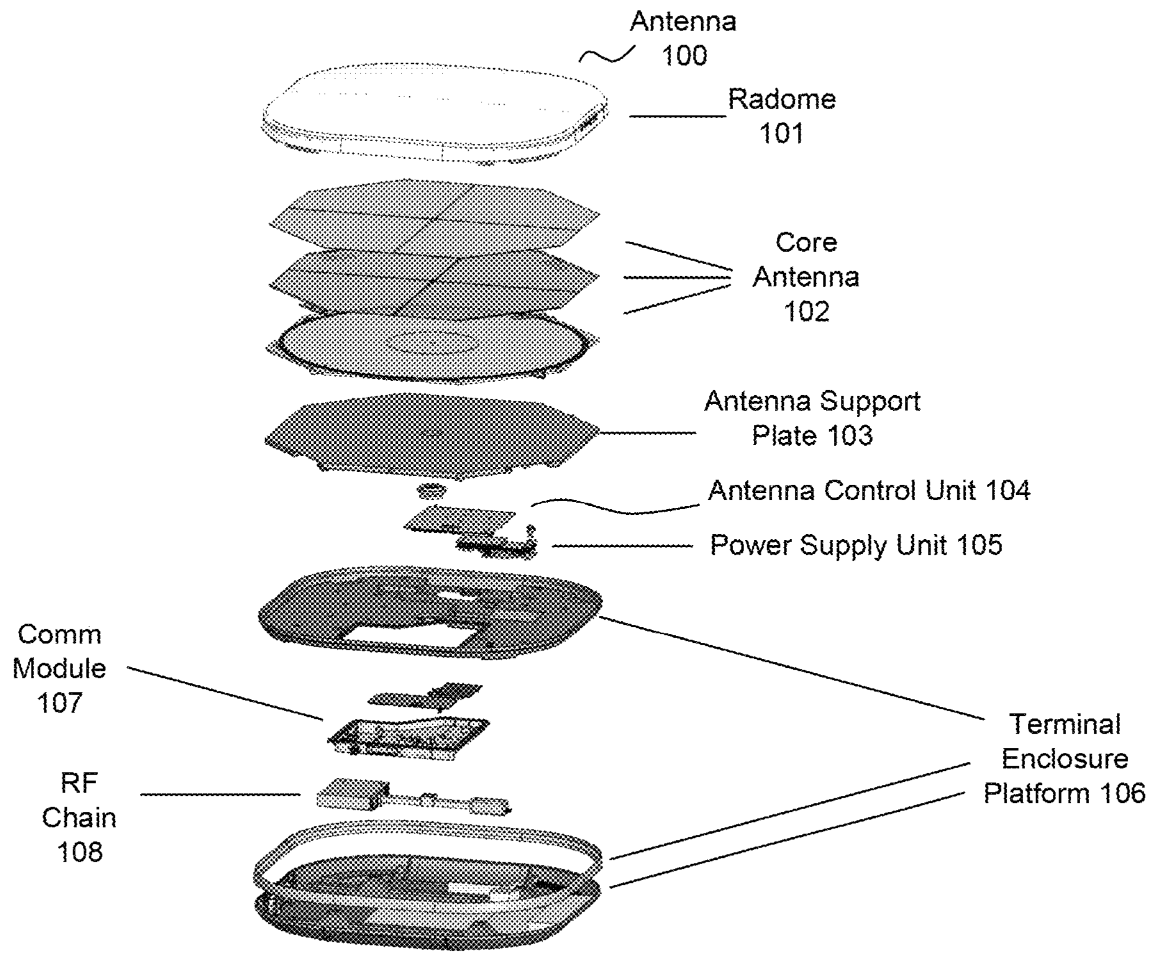
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the teachings disclosed herein may be practiced without these specific details. In other instances, well-known structures and devices are shown in block diagram form, rather than in detail, in order to avoid obscuring the present disclosure.

Antennas having an active metasurface with a high-performance configuration and method for using the same are described. In some embodiments, the active metasurface includes an amplifier (PA/LNA) that is used in transmitting and receiving modes to amplify the signal. In some embodiments, the antennas include metasurface antennas with amplifiers incorporated into the metasurface in a single layer to amplify signals.

In some embodiments, the antennas have an active metasurface configuration with low reflection loss. Techniques are disclosed herein for an active metasurface that significantly reduce the reflection loss of these structures.

The following disclosure discusses examples of antenna apparatus embodiments that can be part of terminals described herein, followed by details of active metasurfaces with amplifiers incorporated in the metasurface, high-performance active metasurfaces, and active metasurfaces with low reflection loss.

Examples of Antenna Embodiments

The techniques described herein may be used with a variety of satellite antennas, for example, flat panel satellite antennas. Some embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Pat. No. 11,489,266, entitled "Metasurface Antennas Manufactured with Mass Transfer Technologies," issued Nov. 1, 2022. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, or other tunable capacitance devices, could be placed into an antenna aperture or elsewhere in variations on the embodiments described herein.

Although embodiments in this disclosure may draw on some examples in communications, some embodiments could be implemented in various receiving, transmitting, and/or sensing or other similar applications. Some examples could include devices for radar, lidar, sensors and sensing device such as, but not limited to, those in autonomous vehicles applications, and any other applications that can take advantage of attributes of an active metasurface according to various disclosed and undisclosed embodiments of the present disclosure.

In some embodiments, the antenna aperture having the one or more arrays of antenna elements is comprised of multiple segments that are coupled together. In some embodiments, when coupled together, the combination of the segments form groups of antenna elements (e.g., closed rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Pat. No. 11,489,266, entitled "Metasurface Antennas Manufactured with Mass Transfer Technologies," issued Nov. 1, 2022. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor(s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QoS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
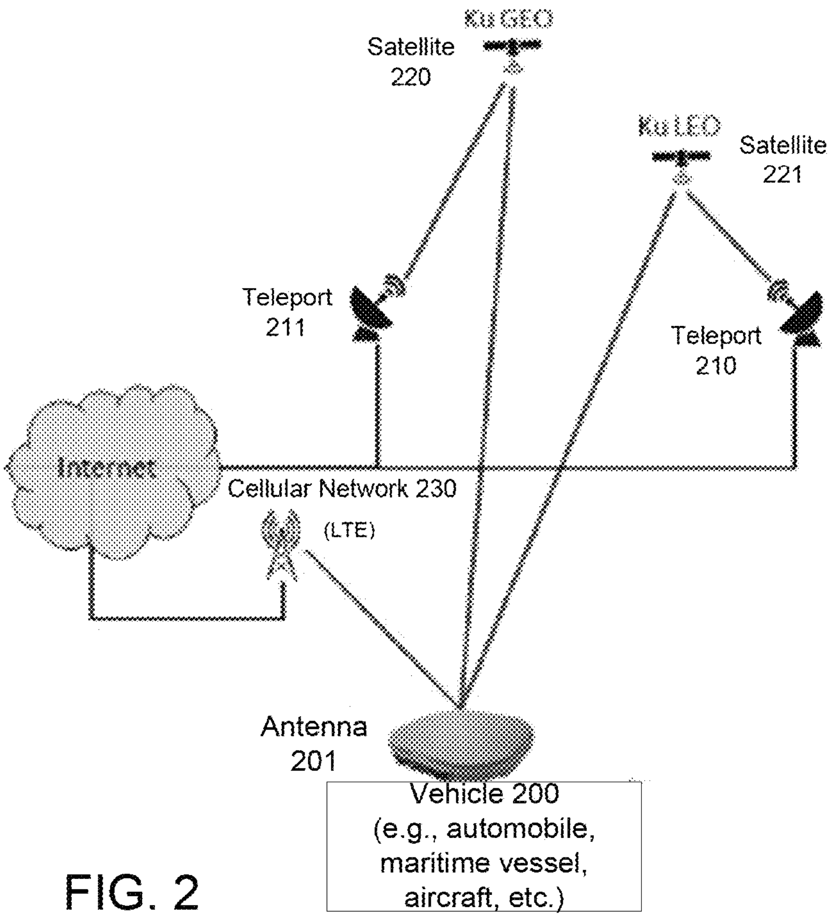
FIG. 2 illustrates an example of a communication system that includes one or more antennas according to some embodiments.

FIG. 2 illustrates an example of a communication system that includes one or more antennas described herein. Referring to FIG. 2, vehicle 200 includes an antenna 201. In some embodiments, antenna 201 comprises antenna 100 of FIG. 1. In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. Pat. No. 11,818,606, entitled "Multiple Aspects of Communication in a Diverse Communication Network", and issued Nov. 14, 2023.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221.

Thus, the antennas described herein may be part of a satellite terminal that enables ubiquitous communications and multiple different communication connections. In some embodiments, antenna 201 comprises a metasurface RF antenna having multiple RF radiating antenna elements that are tuned to desired frequencies using RF antenna element drive circuitry. The drive circuitry can include a drive transistor (e.g., a thin film transistor (TFT) (e.g., CMOS, NMOS, etc.), low or high temperature polysilicon transistor, memristor, etc.), a Microelectromechanical systems (MEMS) circuit, or other circuit for driving a voltage to an RF radiating antenna element. In some embodiments, the drive circuitry comprises an active-matrix drive. In some embodiments, the frequency of each antenna element is controlled by an applied voltage. In some embodiments, this applied voltage is also stored in each antenna element (pixel circuit) until the next voltage writing cycle.

Single Layer Active Metasurfaces

Embodiments disclosed herein include antennas having an active metasurface, in which amplifiers are incorporated into a metasurface to amplify a signal received by the metasurface and/or a signal to be transmitted by the metasurface. In some embodiments, the metasurface includes a single layer of tunable radiating antenna elements. In some embodiments, tunable radiating antenna elements include gaps (e.g., slots) as a way to realize a single layer active metasurface. In some embodiments, an amplifier is coupled across the gap. The amplifier receives an input signal at its input terminal(s), amplifies it, and provides the amplified signal at its output terminal(s). In some embodiments, the input terminal(s) of the amplifier is coupled (e.g., connected) to two points of the antenna element and samples the data (or input signal), while the output terminal(s) of the amplifier excites the radiating part of the antenna (at its two points) with the amplified signal. The input terminal(s) of amplifier can be coupled to a portion of the radiating part of the antenna element and output terminal(s) of amplifier can be coupled to another portion of the radiation part of the antenna.

In some embodiments, the gap comprises a slot. In some embodiments, the slot comprises a folded slot, and the folded slot includes a pair of conductor folded sections in the slot. The folded conductors are coupled to a transistor. In some embodiments, the folded slots of the plurality of tunable radiating antenna elements in the metasurface are in a single layer. In some embodiments, the transistor includes a gate, a source, and a drain, with the gate and the drain being coupled to opposite sides, or edges, of the slot that run length-wise along the edge of the slot and the source being coupled to the pair of folded conductors of the folded slot.

In some embodiments, a tuning element is coupled to each tunable radiating antenna element to tune the folded slot. In some embodiments, a capacitor is coupled (e.g., connected) in series with the tuning element, and an amplifier is coupled in parallel to the series-coupled (e.g., connected) tuning element and capacitor. In some embodiments, the tuning element comprises a varactor. In some embodiments, the capacitor comprises a Metal-Insulator-Metal (MIM) capacitor. In some embodiments, this combination of tuning element, capacitor, and amplifier is included in a single die that is coupled (e.g., connected) across and above a portion of each folded slot. In some embodiments, terminals of the tuning element and amplifier are coupled to the gate of the transistor that is coupled to the folded slot as described above and the capacitor and the other terminal of the amplifier are coupled to drain of that transistor.

Figure 3A:
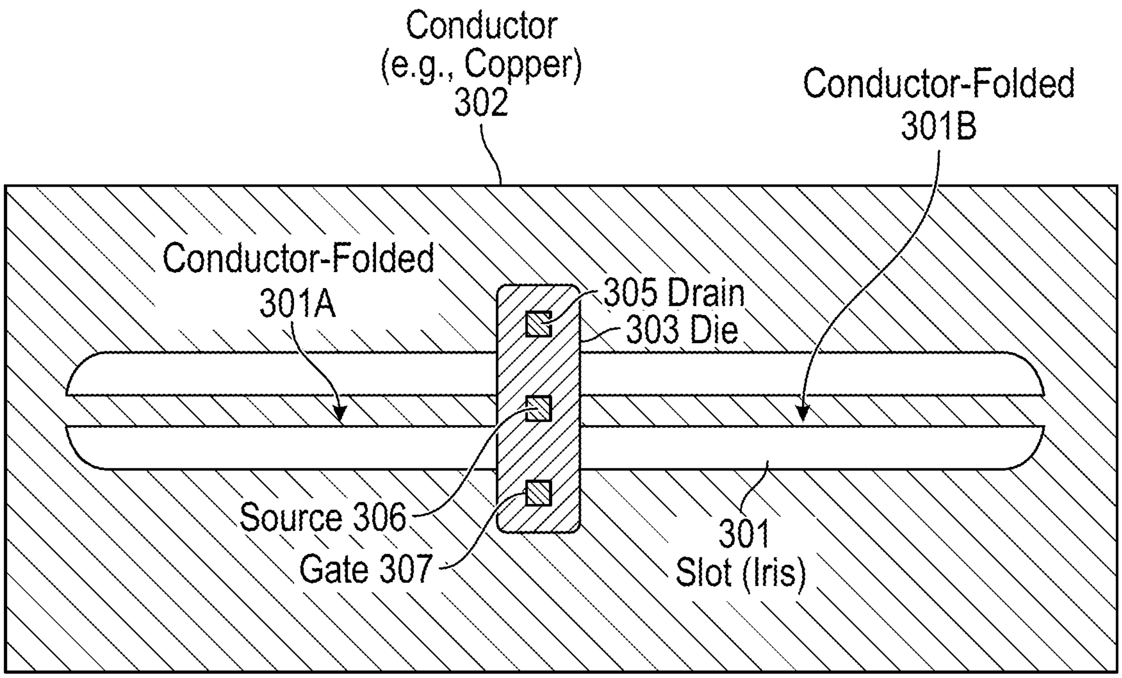
FIGS. 3A and 3B illustrate top and side views of a folded slot of some embodiments of a radiating antenna element.
Figure 3B:
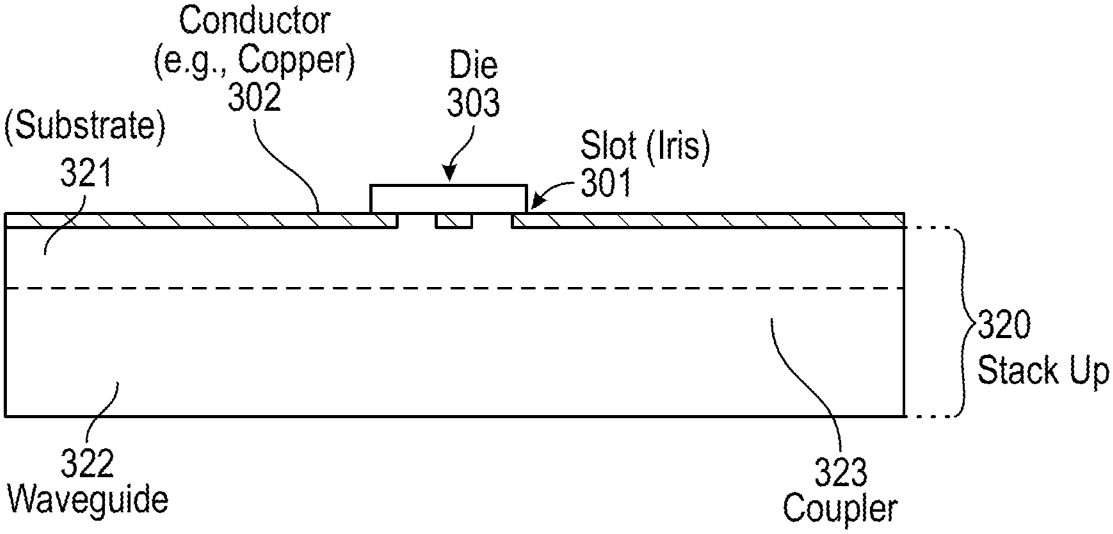

FIGS. 3A and 3B illustrate top and side views of a folded slot of some embodiments of a radiating antenna element. Such a radiating element can be part of a metasurface of an antenna. Referring to FIGS. 3A and 3B, a conductor 302 includes slot (iris) 301. In some embodiments, conductor 302 includes copper or some other metal or conductive material. Slot 301 includes two conductors 301A and 301B that extend through the central portion of slot 301 as slot 301 extends lengthwise. A transistor with a drain 305, a source 306 and a gate 307 is coupled (e.g., connected) to slot 301. In some embodiments, the transistor is connected to the folded parts, conductors 301A and 301B, of slot 301. In some embodiments, the transistor's source 306 is connected to the folded parts of slot 301 and the folded parts are shorted and connected to the side edges of slot 301. Two irises are stacked horizontally in FIG. 3A. In some embodiments, since the electric fields can be weak in the edge of slot 301, connecting the folded conductors 301A and 301B to the body of conductor 302 does not or may not change the electric field distributions. In some embodiments, the drain 305 of the transistor is connected or coupled to or towards one side of slot 301 (the upper edge of the slot in FIG. 3A) and gate 307 is connected or coupled to or towards the other side of slot 301 (the lower edge of the slot in FIG. 3A). This topology can be used for, as an example, common source amplification (e.g., with a common source amplifier) on the radiating antenna element.

In some embodiments, die 303 is coupled to and across (over) the width of slot 301. In some embodiments, die 303 includes a tuning element (e.g., varactor, MEMS, patch, etc.) to tune slot 301. In some embodiments, die 303 includes a capacitor (e.g., a MIM, a capacitor in series with the tuning element, etc.). In some embodiments, die 303 includes an amplifier (e.g., common source amplifier, common drain amplifier, etc.). In some embodiments, die 303 includes a tuning element, a capacitor, and an amplifier.

In some embodiments, die 303 is coupled to, and in some embodiments across (over), the width of slot 301 at a central portion, or location, along the length of slot 301. However, this placement at the center is not a requirement, and in some other embodiments, die 303 is coupled to, and in some embodiments across (over), the width of slot 301 at other locations along the length of slot 301. In various embodiments, the location or positioning of die 303 (e.g., varactor plus MIM capacitor plus amplifier) can be changed inside or in relation to the slot 301 (iris).

Figure 5:
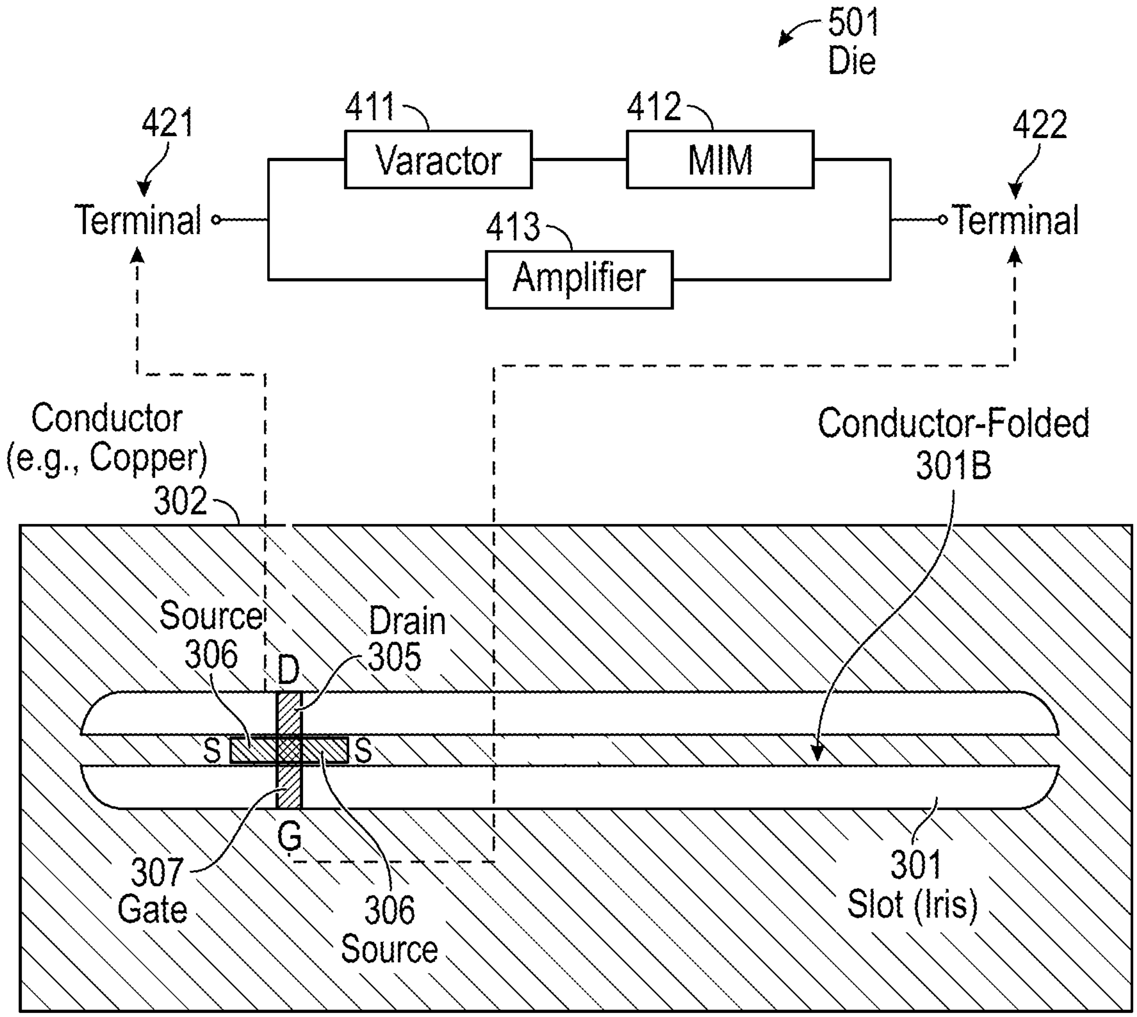
FIG. 5 illustrates an alternative placement of a die along the length of a slot closer to the end of slot.

FIG. 5 illustrates an alternative placement of a die that is along the length of slot 301 closer to the end of slot 301. Referring to FIG. 5, in some embodiments, the slot has a length and a width, and a die 501, for example a single die, is coupled across its width at a position that is offset from a central portion of its length. Die 501 can be die 303 of FIGS. 3A and 3B. Note that the placement of die 501 in FIG. 5 is an example, and die 501 can be placed at different locations along its length based on, for example, the voltage and current varied inside slot 301. This is particularly useful when configuring slot 301 for the desired frequency because it enables controlling loss. In such a case, depending on the different amplifier, MIM and varactor components that may be used in the die, the die can be selectively positioned, for example moved or offset, from the center of slot 301 to enable slot 301 to operate properly at the desired frequency.

FIG. 3B illustrates some embodiments of a stack up that is below the metasurface. The techniques disclosed herein are not limited to using the stack up shown in FIG. 3B and can be used with other stack ups. Referring to FIG. 3B, stack up 320 includes a substrate 321 that is coupled to conductor 302. In some embodiments, substrate 321 comprises a printed circuit board (PCB). However, substrate 321 can comprise other materials. A coupler 323 is coupled to substrate 321, and a waveguide 322 is coupled to coupler 323. In some embodiments, waveguide 322 propagates a feed wave that coupler 323 couples to substrate 321, where it propagates to and interacts with the slot 301 as the radiating antenna element.

In some embodiments, die 303 provides an advanced design of a tuning and amplification topology for the two purposes of tuning and amplification. In some embodiments, the topology includes a tuning element such as, for example, a varactor and fixed capacitor such as, for example, a metal-insulator-metal (MIM) capacitor connected in series with an amplifier connected in parallel with the series connection of the tuning element (varactor) and fixed capacitor (MIM capacitor).

Figure 4:
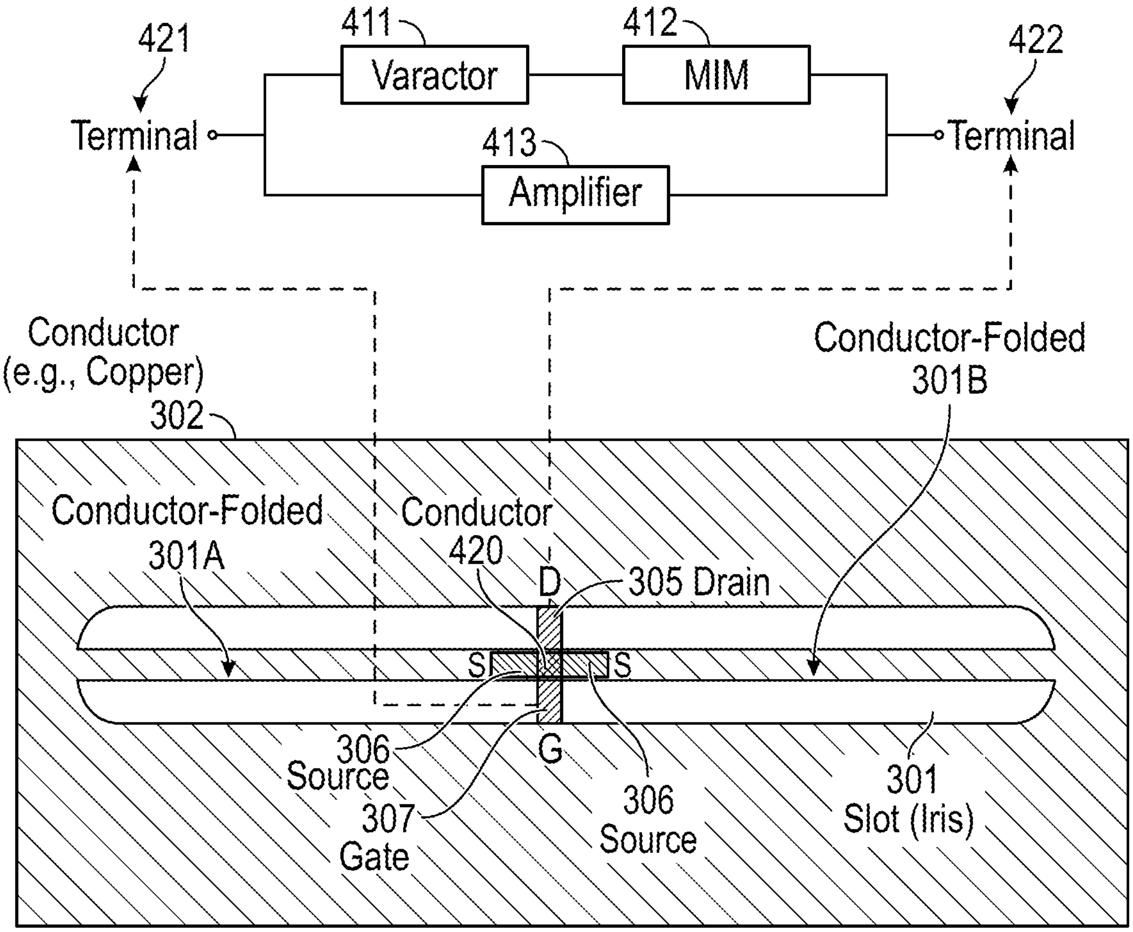
FIG. 4 illustrates some embodiments of a radiating antenna element having a die with a tuning element, capacitor and an amplifier.

FIG. 4 illustrates some embodiments of a folded slot antenna element having a die with a tuning element, capacitor and an amplifier. This die can be used as die 303 of FIGS. 3A and 3B. Referring to FIG. 4, a varactor 411 is connected or coupled in series with MIM capacitor 412. The input of varactor is coupled to terminal 421, and MIM capacitor 412 is coupled to terminal 422. In some embodiments, amplifier 413 is connected or coupled in parallel to the series connection of varactor 411 and MIM capacitor 412. In some embodiments, terminal 422 connecting amplifier 413 to MIM capacitor 412 is connected or coupled to drain 305 of the transistor, while terminal 421 connecting amplifier 413 to varactor 411 is connected or coupled to gate 307 of the transistor. In some embodiments, amplifier 413 is a single transistor amplifier with its drain (D) at terminal 421 connected or coupled to gate 307 and its gate (G) at terminal 422 connected or coupled to drain 305. Different types of amplifiers can be used for amplifier 413. For example, amplifier 413 can be, for example, but not limited to, class A, class AB, high power, low power, Tx/Rx amplifier, etc. Conductor 420 at the center serves as a reference voltage, acting as a virtual AC (RF) ground.

In some embodiments, the tuning behavior for tuning the radiating antenna element is performed with varactor 411 and MIM capacitor 412. FIG. 4 also illustrates the placement of amplifier 413, and the rest of the die. In some embodiments, amplifier 413 is placed in parallel with the resonator of the radiating antenna element, which constitutes slot 301 in conjunction with varactor 411 and MIM capacitor 412. Amplifier 413 acts on the received or transmitted signal when slot 301 is used during receive (when the antenna receives signals) or transmit (when the antenna is transmitting signals), respectively. The side view of the antenna element is the same as that of FIG. 3B.

In operation, during transmit, in some embodiments, a feed wave propagates through a waveguide and is coupled via a coupler to the folded slot which is tuned by the varactor (or some other type of tuning element) and amplified by the amplifier (e.g., power amplifier) in the die, and thereafter transmitted by the radiating antenna element. During receive, while the varactor tunes the folded slot, the antenna element receives a signal that is amplified by an amplifier (e.g., low noise amplifier) in the die and then coupled from the tunable folded slot to the waveguide.

Figure 6:
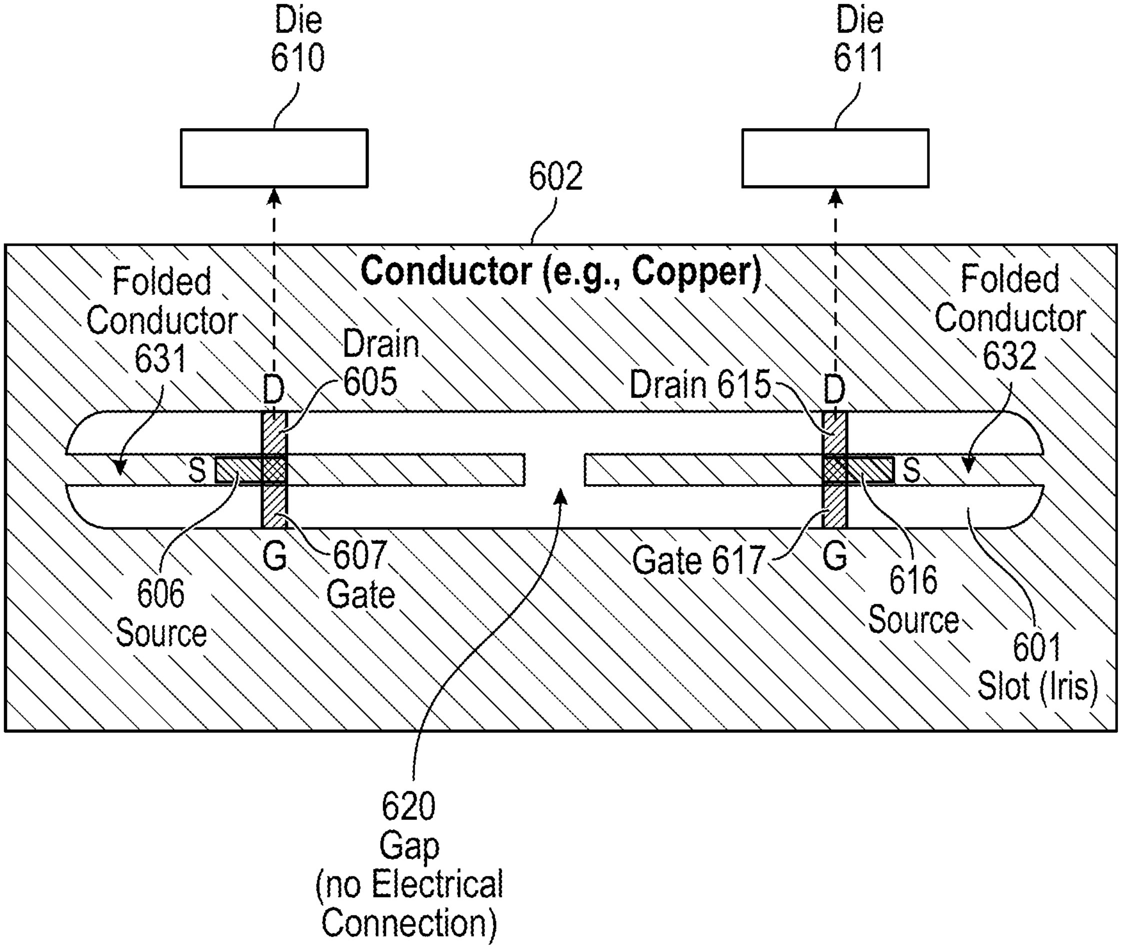
FIG. 6 illustrates the use of two dies for noise cancellation applications.

In some embodiments, more than one die (e.g., die 303) can be coupled to a slot for noise cancellation purposes. For example, FIG. 6 illustrates the use of two dies for noise cancellation applications. The two dies can include a combination of different amplifier for noise cancelation applications. In some embodiments, each die includes a varactor, MIM capacitor and an amplifier, such as is shown above in FIGS. 4 and 5. In some embodiments, the amplifiers of Die 610 and Die 611 are different, while the varactors and MIM capacitors are the same. Alternatively, the varactors and MIM capacitors in Die 610 and Die 611 are different, and the amplifiers are the same. However, in some other embodiments, the components in Die 610 and Die 611 are different from each other. Other configurations are contemplated to fall within the scope of the present disclosure.

From the noise perspective, the noise coming out of a common gate (CG) amplifier exhibits different polarities at its source and drain nodes. In some embodiments, the noise at the source terminal further drives the antenna, exciting an identical standing-wave noise-voltage distribution across the slot, thus leading to the same noise polarity at the input of the common source (CS) stage. After going through the CS path, the polarity of the noise changes. Eventually, the noise polarities are the same at the CG/CS outputs. As a result, the noise (from the CG amplifier) is canceled.

Referring to FIG. 6, Die 610 and Die 611 are connected or coupled across and above slot 601 that includes folded conductors 631 and 632, according to some embodiments. There is a gap 620 between folded conductors 631 and 632 such that their ends are not electrically connected. In some embodiments, a current null is established at the center of the folded slot 601 by removing a small portion of the conductor at gap 620. Consequently, the central portion of the antenna is opened, enabling the application of various CG/CS biasing voltages without compromising the antenna's characteristics. In some embodiments, the gap can be as small as 100-200 micrometers. Gap 620 provides the option of running two amplifiers in the slot for noise cancellation purposes.

In some embodiments, one terminal of Die 610 is connected or coupled to gate 607 of a first transistor that has its source 606 shorted to the folded conductor 631 while the other terminal of Die 610 is connected or coupled to drain 605 of the first transistor, and one terminal of Die 611 is connected or coupled to gate 617 of a second transistor that has its source 616 shorted to the folded conductor 632 while the other terminal of Die 611 is connected or coupled to drain 615 of the second transistor. In some other embodiments, one terminal of Die 610 is connected or coupled to gate 607 of a first transistor that has its source 606 shorted to the folded conductor 631 while the other terminal of Die 610 is connected or coupled to drain 605 of the first transistor, and one terminal of Die 611 is connected or coupled to a source 616 of a second transistor that has its gate 617 shorted to the folded conductor 632 while the other terminal of Die 611 is connected or coupled to drain 615 of the second transistor. The side view of the antenna element of FIG. 6 is the same as that of FIG. 3B except that there are two dies instead of one.

One or more advantages of one or more metasurface embodiments with folded slot described herein include: improved receive (Rx) antenna gain/noise temperature performance, lower power consumption, reduced manufacturing complexity of active metasurfaces, a more highly integrated terminal design, and smaller height profile.

High-Performance Active Metasurfaces

Some embodiments described herein include an antenna element architecture in series with power amplifiers as high performance transmit (Tx) and receive (Rx) unit cell in active metasurfaces. In some embodiments, a power amplifier with a high gain and high power-added efficiency is integrated with a radiating unit cell for use in the transmit mode (when the antenna is transmitting signals), while in the receive mode (when the antenna is receiving signals), an amplifier with low noise figure, moderate gain, and very low power consumption is integrated with a radiating element. While many structures may be used in active metasurfaces including an active radiating element, a tunable element, matching circuitry, antenna element, a coupler, etc., many of them fail to achieve one or more performance metrics. There are many challenges and trade-offs such as, for example, stability, power consumption, gain, noise figure, size, tunability (direct modulation), power-added efficiency, etc. and only very few designs can successfully overcome those challenges. Some embodiments disclosed herein include an active metasurface unit cell that provides a high performance in Tx and Rx modes and can be used for an active metasurface structure.

Some embodiments of the disclosed metasurface unit cells include one or more of the following new features:

1) Improved isolation between the antenna radiator, coupler and waveguide. This results in less radiation inside the waveguide and improved reflection coefficient.
2) A well-designed coupler that prevents the spurious radiation from the coupler into free space. Also, the coupling between antenna and coupler can be reduced to avoid instability. In this way, the power amplifier (PA) and low noise amplifier (LNA) can be designed easier with more flexibility due to unconditional stability.
3) High gain, low noise figure, and high power-added efficiency. Due to the design flexibility, high performance can be achieved.
4) In Tx, the signal is modulated first, then amplified by a power amplifier, and transmitted by an electrically small antenna. In Rx, the signal is received by the antenna, amplified with a low noise figure using a LNA, and then the amplified signal is modulated by a varactor. The use of amplifiers in the receive mode improves the noise figure as the lossy element (e.g., varactor) is after the LNA.

Due to size restrictions, the antenna is an electrically small antenna with low resistance and high capacitance, and this drops the efficiency significantly. In some embodiments, a wide-angle impedance matching (WAIM) matches the impedance of the antenna to that of the free space and improves the efficiency. Also, designing an electrically small antenna that is close to the Chu limit will increase the efficiency of the metasurface unit cell. Embodiments disclosed herein have one or more improvements:

A. In the transmit (Tx) side: 1. Improved power-added efficiency, 2. Low power consumption, 3. High gain, 4. Unconditional stability, 5. Low mutual coupling between antenna and coupler, and waveguide, 6. High efficiency.
B. In the receive (Rx) side: 1. Very low noise figure and higher Gain/Noise performance, 2. High gain, 3. Unconditional stability, 4. Low power consumption, 5. Low mutual coupling between antenna and coupler, and waveguide, 6. High efficiency, 7. Improved tunability.

In some embodiments, there are four main components of the unit cells: a tunable coupler, an LNA/PA with their matching circuits, an antenna, and a WAIM. The coupler tunes the magnitude and phase of the signal coming from waveguide (in Tx) or from antenna/LNA (in Rx). In Tx, the PA amplifies the signal with a high gain and high power-added efficiency. In Rx, the LNA amplifies signal with low-noise performance and moderate gain. The antenna transmits/receives the signal in Tx/Rx modes, respectively. The WAIM also improves efficiency by converting the impedance of the free space to an impedance that can be better matched with the impedance of the antenna. The WAIM also improves the performance of the metasurface for the wide scans.

In some embodiments, the antenna includes a metasurface having radiating antenna elements and amplifiers configured to amplify signals for the radiating antenna elements. In some embodiments, each of the radiating antenna elements includes: a grounded patch antenna. However, the techniques disclosed herein are not limited to grounded patch antennas. For example, in some embodiments, the radiating antenna elements can include any other electrically small antenna with efficiency-bandwidth product close to Chu limit, such as, for example, but not limited to, a spiral antenna, a loop antenna, etc. In some embodiments, each of the radiating antenna elements also includes one or both of: a low noise amplifier (LNA) coupled to the antenna and configured to amplify signals after reception by the antenna, and a power amplifier (PA) coupled to the antenna and configured to amplify signals to be transmitted by the antenna. In some embodiments, the grounded patch antenna is electrically shorted to a ground plane (e.g., a metal or other conductive layer). In some embodiments, the grounded patch antenna is electrically shorted to a ground plane using multiple vias (e.g., conductors, wires).

In some embodiments, the antenna also includes a tunable coupler coupled to the patch antenna using a wire (via) cage (e.g., a via cage with multiple vias). The coupler can include a tunable slot to couple a feed wave to a radiating antenna element, and a tuning element (e.g., a varactor, MEMS, etc.) coupled to the tunable slot to tune the tunable slot. In some embodiments, a LNA is coupled between the tuning element (e.g., varactor, etc.) and the patch antenna.

In some embodiments, one set of vias traverses a substrate and is coupled to or towards a first side of a conductive layer containing the slot and to one or more transmission lines (e.g., microstrip lines, etc.). The conductive layer is coupled to or towards one side of the substrate and the one or more transmission lines coupled to or towards a second side of the substrate different from, or opposite, the first side of the substrate. In some embodiments, the tuning element (e.g., a varactor, etc.) is coupled across the slot on a second side of the conductive layer that is different from, or opposite, the first side of the conductive layer. The tuning element can be coupled to the second side of the substrate and connected or coupled to at least one of those one or more transmission lines at a position that is over and across the slot. In some embodiments, the tuning element is coupled to the conductive layer using vias within the wire cage. In some embodiments, the conductive layer is a ground layer.

Figure 7A:
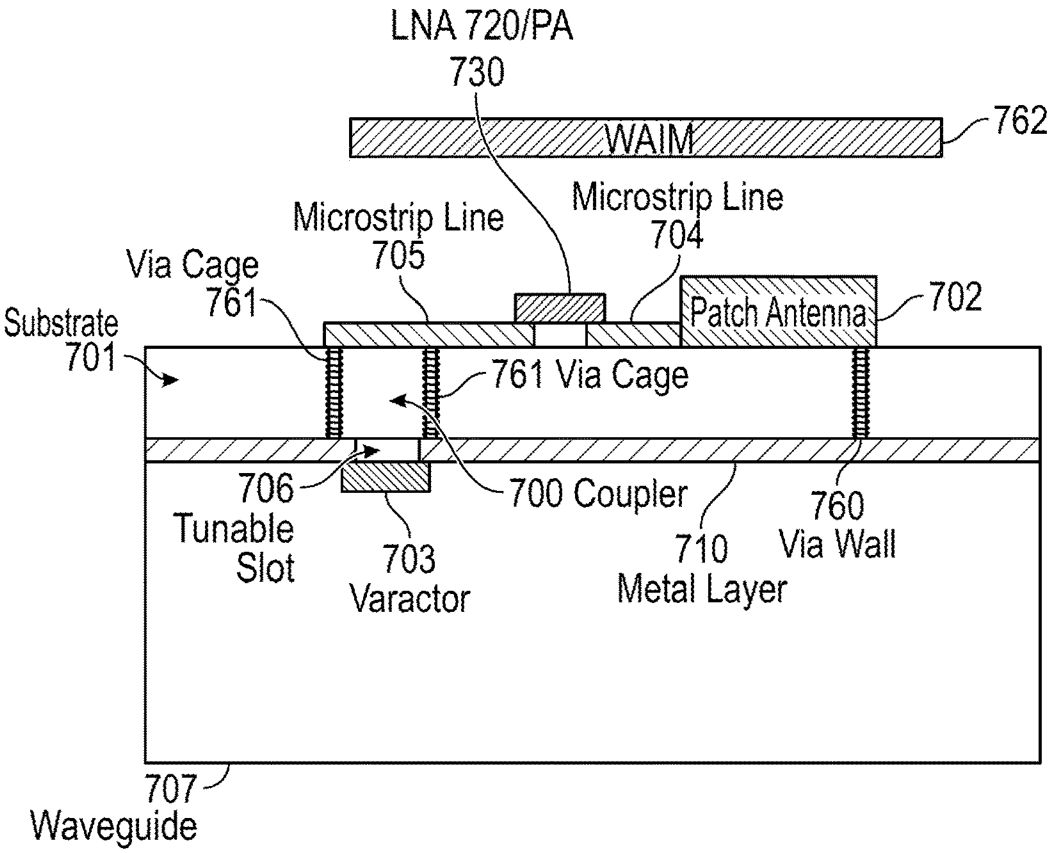
FIGS. 7A and 7B illustrate top and side views of some embodiments of a unit cell of a metasurface structure.
Figure 7B:
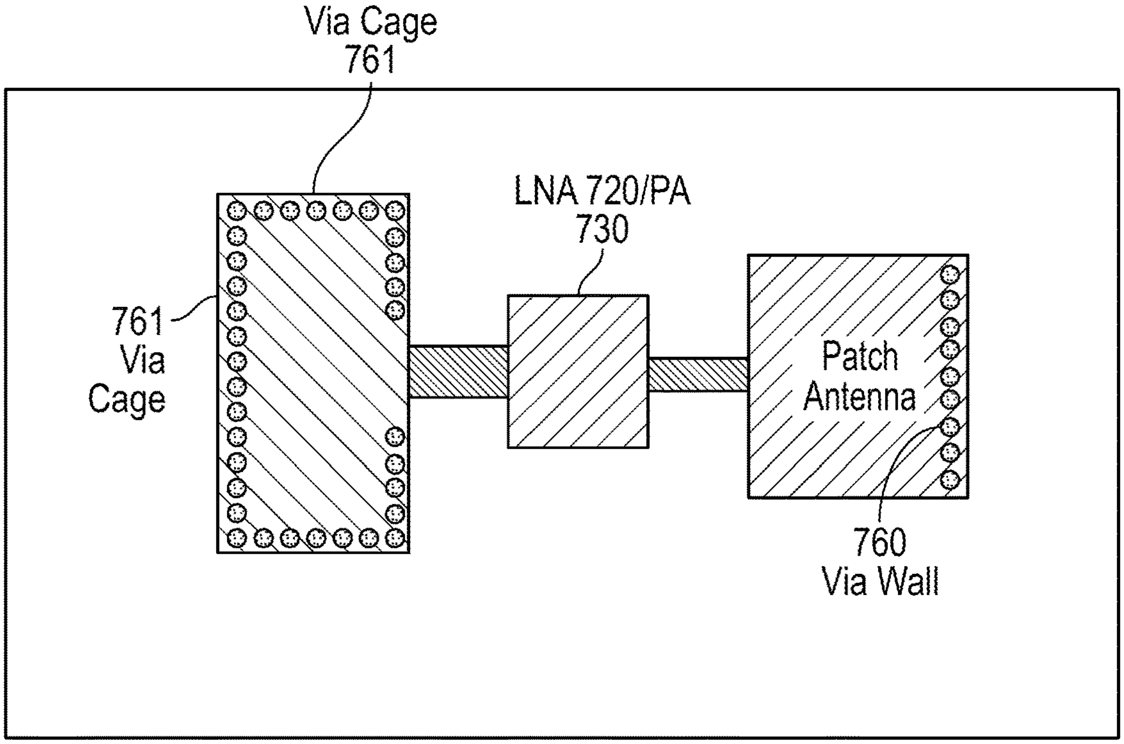

FIGS. 7A and 7B illustrate top and side views of some embodiments of a unit cell of the metasurface structure. Referring to FIGS. 7A and 7B, the metasurface structure includes a varactor (or other tuning element) 703, a tunable slot 706, which is part of a coupler 700, an LNA 720/PA 730, a patch (static) antenna 702 ground using a wire (e.g., via) wall 760, and a WAIM 762. In some embodiments, coupler 700 is within via cage 761 that includes several of vias (wires). Via cage 761 traverses substrate 701 from microstrip line 705 to metal layer 710. In some embodiments, patch antenna 702 is electrically grounded using a via (wire) wall 760 that includes a number of vias (wires).

When operating, an incoming signal is received by a patch antenna 702 that is attached to substrate 701. At this point, there is no modulation (e.g., amplitude and/or phase shifting for beamforming) applied to the received signal. In some other embodiments, other types of radiating antenna elements can be used. The received signal is then carried via microstrip line 704 (or some other transmission line (e.g., CPW, etc.)) attached to substrate 701 to LNA 720, where the received signal is amplified. A microstrip line 705 (or other transmission line) attached to substrate 701 carries the amplified signal from LNA 720 and then its energy couples via tunable (coupling) element/slot 706 in metal layer 710 to waveguide 707. At this stage, while the amplified received signal is being coupled to waveguide 707, modulation (e.g., hologram modulation) is applied and its phase and/or amplitude are adjusted for beamforming using a tuning element coupled across, and loading, tunable slot 706. In some embodiments, the tuning element is a varactor 703, and this architecture assumes that the varactor in every unit cell can be controlled individually. Thus, varactor 703 (or another type of tuning element) is able to tune the impedance to cause a phase shift to the signal to implement modulation. The hologram is created at the coupling layer and not the radiating element.

During transmit, a wave propagates through waveguide 707 to tunable slot 706, where it's phase-shifted as it's being coupled to microstrip 705 via tunable slot 706. Varactor 703 is tuned to apply modulation to the transmit signal (e.g., creating a hologram at the coupling layer and not the radiating element). The modulated signal is coupled to microstrip line 705 and proceeds through PA 730 where the transmit signal is amplified and then passed to patch antenna 702, via microstrip line 704, where patch antenna 702 radiates the transmit signal. Note that while shown together in FIGS. 7A and 7B for convenience, LNA 720 and PA 730 are separate electronic components.

In this configuration, the radiation portion of the metasurface is separated from waveguide 707, thereby achieving a stable high gain can be achieved. The stability would be unconditional as the coupling between input and output of PA 730/LNA 720 would be significantly low. One other advantage of this configuration is that the coupler does not radiate due to having a via (wire) cage 761 with multiple vias (wires). Via cage 761 can be designed or configured to reduce, and potentially avoid, radiation from coupler 700 interfering with patch antenna 702. In some embodiments, the spacing between vias in via cage 761 is not greater than the diameter or thickness of the via itself.

In some embodiments where the antenna is electrically small which results in having a low radiation resistance, where electrically small means that the antenna size is small compared to the working wavelength (which is proportion to the inverse of frequency). In some embodiments, the electrically small antenna is designed to provide the highest possible radiation resistance (close to Chu limit) over the frequency band of interest, thereby increasing the efficiency. In some embodiments, these characteristics are due to the via (or wire) wall 760 that electrically shorts the back edge of patch antenna 702. As varactor 703 is placed after the LNA 720 in receive (Rx) mode, the noise figure of this structure would be very low.

Figure 8A:
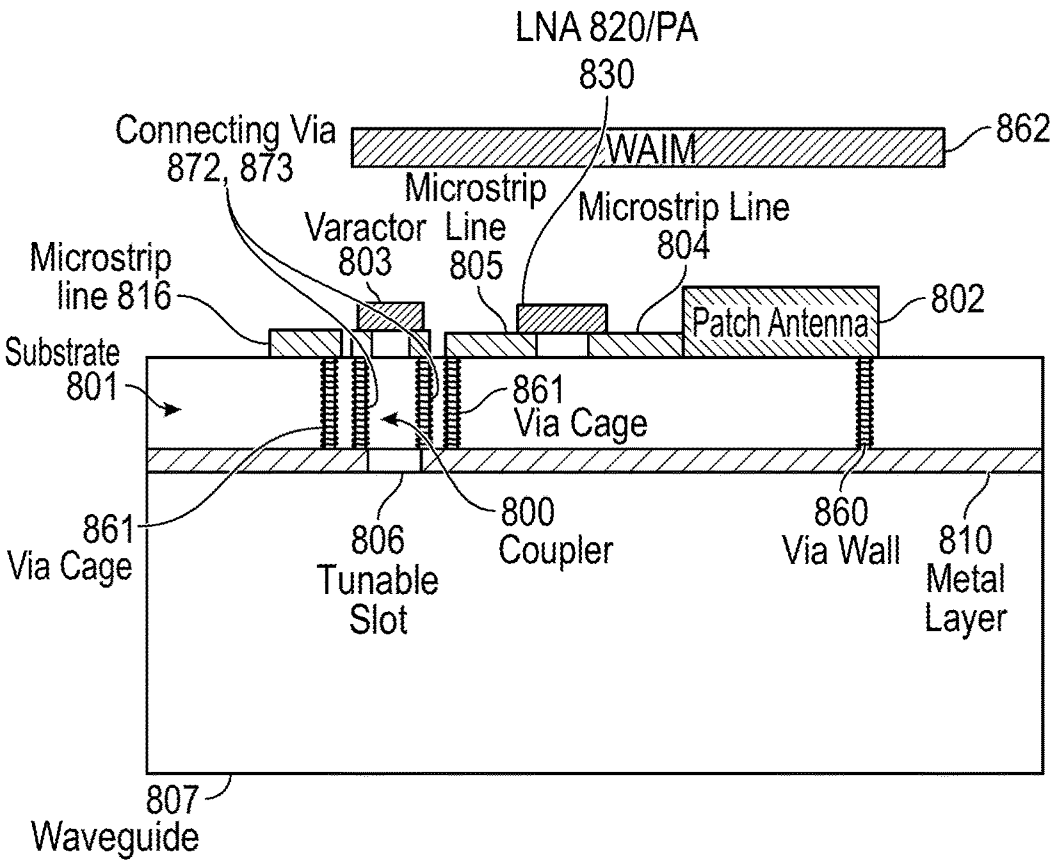
FIGS. 8A and 8B illustrate some other embodiments of unit cell.
Figure 8B:
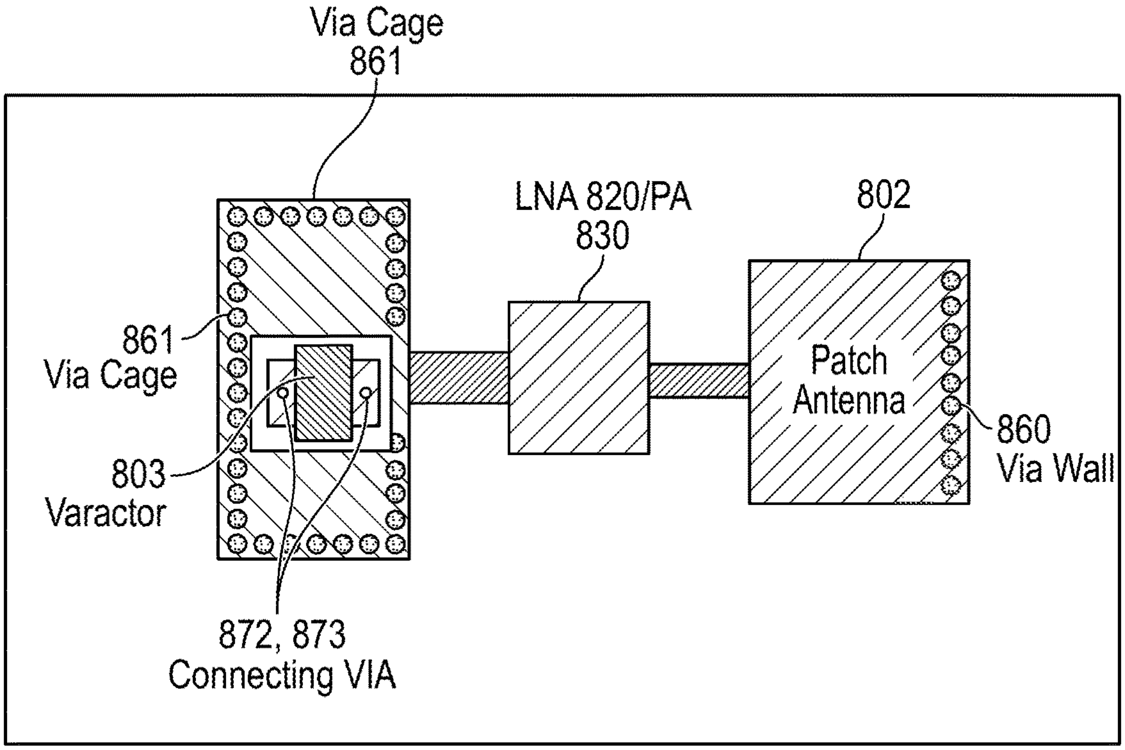

FIGS. 8A and 8B show some other embodiments of a unit cell. To lower the cost, in some embodiments, the varactor can be placed on top of the printed circuit board (PCB) (or other substrate) by using pads and connecting vias. Fabrication costs can be reduced where the stack up can be created and then the components such as the varactor (tuning element), LNA/PA, and the patch antenna can be connected after the stack up has been created. In this new configuration, the slot (iris) can still be tuned by the varactor (tuning element) placed over the PCB. The coupler, LNA/PA, antenna, and WAIM do not change significantly.

FIGS. 8A and 8B illustrate a derivative architecture of the concept in FIGS. 7A and 7B according to some embodiments. Referring FIGS. 8A and 8B, a difference in this architecture is that the varactor is moved adjacent, contiguous, proximate, and/or above the top or microstrip layer, while it is still loading and tuning the coupling slot on the bottom of the substrate. This architecture has the advantage that all discrete components (e.g., the varactor, LNA, PA, etc.) are placed on the same side of the substrate, simplifying the manufacturing process of this architecture. Furthermore, the required drive circuitries for tuning the varactor and for driving the LNAs are on the same side as the discrete components. This arrangement further reduces the complexity in manufacturing. As shown in FIGS. 8A and 8B, thru vias could be used to couple or connect the varactor to load the tunable slot on the bottom side of the substrate with the varactor.

Referring to FIGS. 8A and 8B, according to some embodiments, in operation, a static patch antenna 802 that is attached to substrate 801 receives an incoming signal. At this point, there is no modulation (e.g., amplitude and/or phase shifting for beamforming) applied to the received signal. In some other embodiments, other types of antenna elements can be used. The received signal is then carried via microstrip line 804 (or some other transmission line e.g., CPW, etc.) attached, positioned, or coupled to substrate 801 to LNA 820, where the received signal is amplified. A microstrip line 805 (or other transmission line) coupled to substrate 801 carries the amplified signal from LNA 820 and then its energy couples via tunable coupling element/slot 806 in metal layer 810 to waveguide 807. At this stage, while the amplified received signal is being coupled to waveguide 807 from microstrip line 805 via tunable slot 806, modulation is applied and its phase and/or amplitude are adjusted for beamforming through the use of a tuning element, coupled across microstrip lines on top of substrate 801, that loads tunable slot 806. In some embodiments, the tuning element is a varactor 803, and this architecture assumes that the varactor in every unit cell can be controlled individually. Thus, varactor 803 is able to tune the impedance to cause a phase shift to the signal to implement modulation.

According to some embodiments, in operation, during transmit, a wave propagates through waveguide 807 to tunable slot 806, where it is phase shifted as it is being coupled to microstrip 805 via tunable slot 806. Varactor 803 is tuned to apply modulation to the transmit signal (e.g., creating a hologram at the coupling layer and not the radiating element). The modulated signal is coupled to microstrip 805 and proceeds through PA 830 where the transmit signal is amplified and then passed to patch antenna 802, via microstrip line 804, where patch antenna 802 radiates the transmit signal. Note that while shown together in FIGS. 8A and 8B for convenience, LNA 820 and PA 830 are separate electronic components in some embodiments.

As in FIGS. 7A and 7B, the coupler in FIGS. 8A and 8B does not radiate due to having a via (wire) cage 861 with multiple vias (wires) coupled or otherwise attached between metal layer 810 and both microstrip lines 816 and 805. Via cage 861 is designed or configured to reduce, and potentially avoid, radiation from coupler 800 interfering with patch antenna 802. In some embodiments, the spacing between vias in via cage 861 is not greater than the diameter or thickness of the via itself.

Figure 9A:
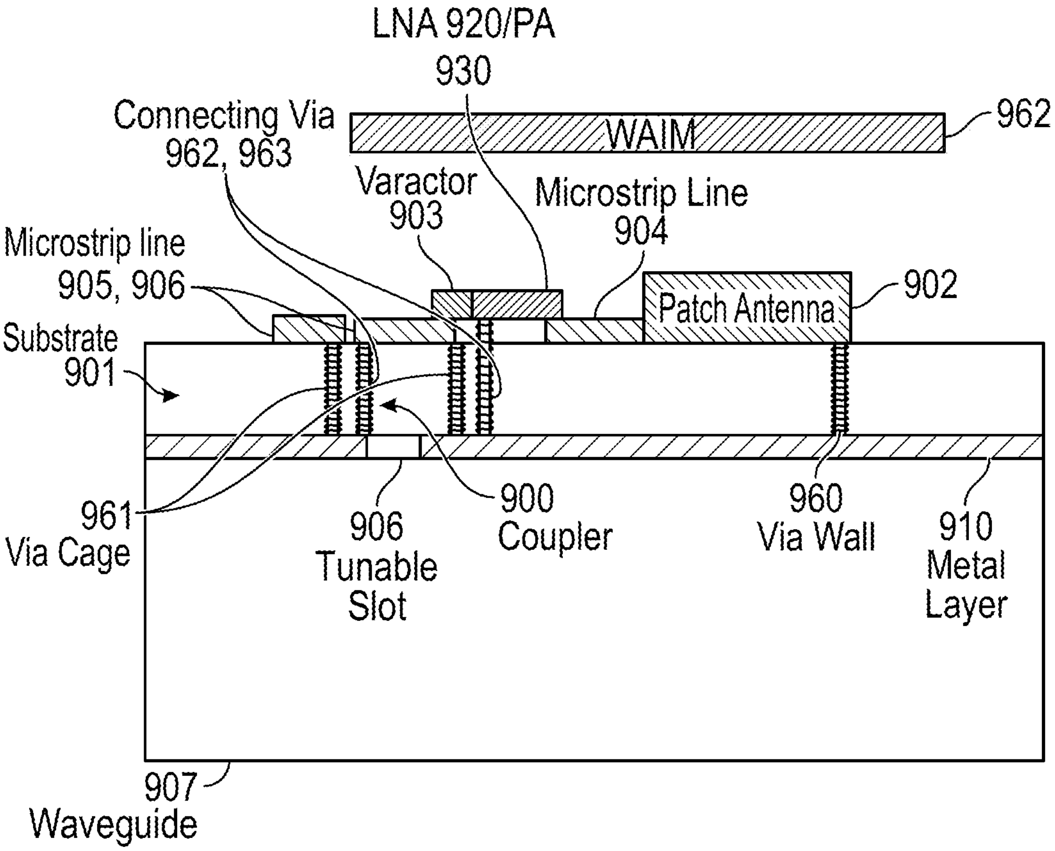
FIGS. 9A and 9B illustrate some other embodiments of unit cell with an integrated varactor (tuning element) and amplifiers.
Figure 9B:
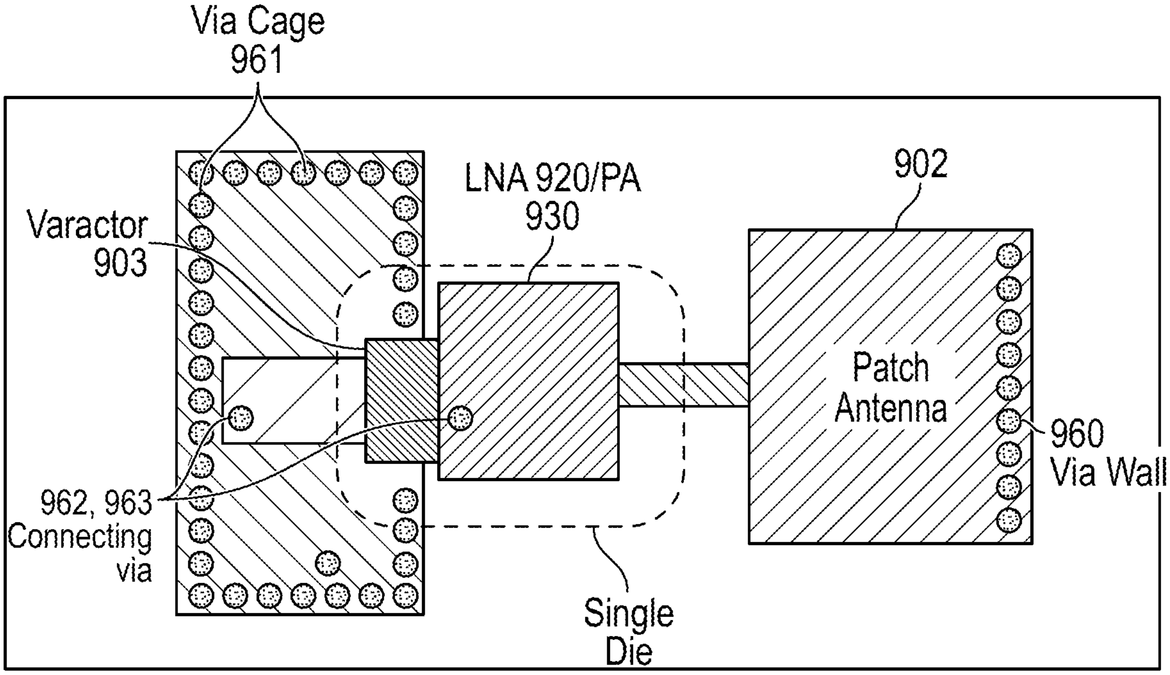

In some embodiments, the varactor is in a die with one or both of the LNA and the PA. FIGS. 9A and 9B illustrate some embodiments of an integration of a varactor (tuning element) with an LNA/PA to further lower the cost. In some embodiments of this configuration, the varactor still tunes the reactance across the slot (iris), and there are two connecting vias 962, 963 that connect varactor 903 to the slot (in parallel). This allows slot 906 to tune the resonant frequency.

Figure 10:
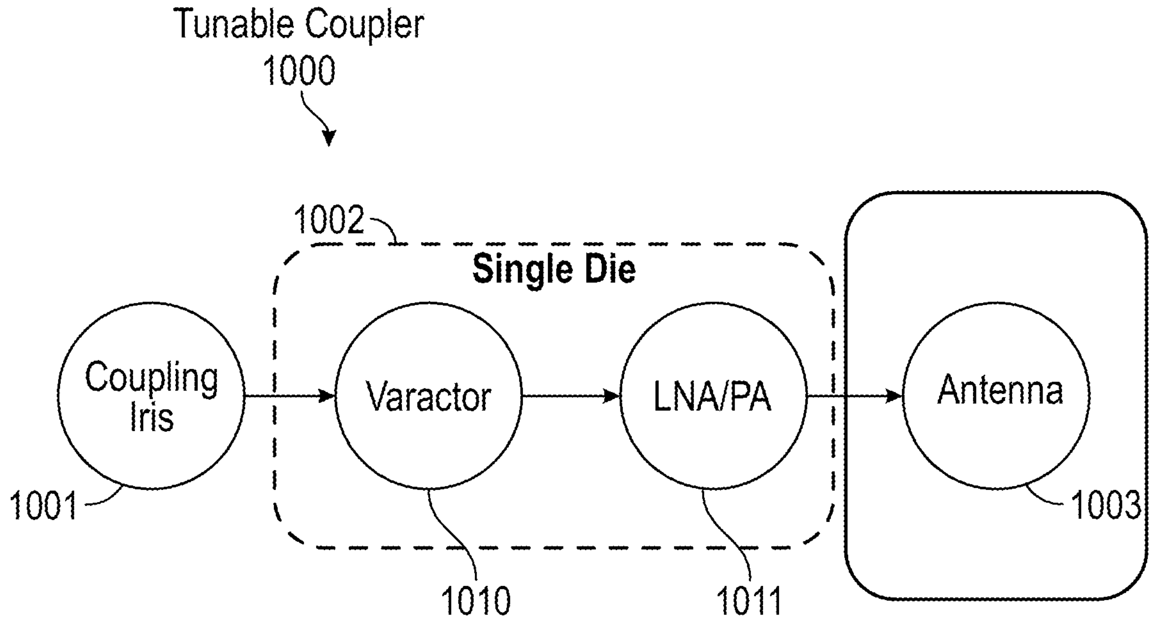
FIG. 10 is a block diagram of some embodiments of a single die metasurface configuration.

In some embodiments, varactor 903 and LNA 920/PA 930 are designed together in a single die to reduce its size and cost. This will also reduce the losses, increase the efficiency and improve the noise figure (in Rx). FIG. 10 is a block diagram of some embodiments of a single die metasurface configuration. While a metasurface structure with high performance is realized using a specific coupler, a varactor, an LNA/PA, and an antenna, one can design it differently by modifying/changing the coupler or antenna. Referring to FIG. 10, a slot (coupling iris) 1001 is coupled to a tunable coupler 1000 that includes a single die 1002 with a varactor 1010 and one or both of LNA/PA 1011. The tunable coupler 1000 is coupled to antenna 1003. Note that while shown together in FIG. 10 for convenience, LNA and PA of LNA/PA 1011 are separate electronic components according to some embodiments.

Some embodiments described above include one or more of the following advantages: very low noise figure and higher gain/noise performance in receive (Rx) mode; high gain with unconditional stability; high efficiency; great tunability; and/or compatible with the PCB design process for a low-cost design.

Active Metasurfaces with Low Reflection Loss

Some embodiments include an active metasurface configuration with low reflection loss. In transmit (Tx) mode, when integrating a power amplifier (PA) into the metasurface structure for each slot (iris), it may cause high reflection loss due to bilateral radiation of the slot. This power loss not only decreases the efficiency, but also may damage the active elements behind the antenna such as, for example, amplifiers. Similarly in receive (Rx) mode, this may decrease the efficiency. In some embodiments, an active metasurface significantly reduces the reflection loss of these structures.

Integrating amplifiers with slots may cause significant power reflection to the source as a slot has a bilateral radiation. This is more significant in Tx mode when the power amplifier has a high gain. In some embodiments, an antenna architecture solves the problem of reflection loss in active metasurfaces. In some embodiments, the disclosed structure includes an active amplifier element (PA/LNA), a tunable element (e.g., varactor), matching circuitry (e.g., for matching the load), an antenna element (e.g., a patch antenna), a coupler (e.g., a slot (iris) as a tunable coupler coupling energy to PA or LNA), and a WAIM. In addition to reflection reduction, in some embodiments, these configurations with low reflection loss can provide good stability (e.g., unconditionally stable when confronted with changes in the environment (e.g., temperature changes in the environment)), low power consumption, high gain, low noise figure (in Rx), fine tunability (direct modulation), high power-added efficiency (in Tx). In some embodiments, the antenna is designed based on metrics related to low power consumption, high gain, low noise figure (in Rx), fine tunability (direct modulation), and/or high power-added efficiency (in Tx) and trade-offs associated with each of these.

Here are some new features of some embodiments of a metasurface unit cell having an antenna element with an amplifier (e.g., LNA, PA, etc.), and varactor (or other tuning element) for use in antenna with low reflection loss:

1) Improved isolation between the radiator (e.g., a patch antenna), coupler and waveguide. This results in less radiation inside the waveguide and very low reflection.
2) Having high gain, low noise figure, and high power-added efficiency due to the design flexibility.
3) In Tx, the signal can be modulated first, then be amplified by a power amplifier, and transmitted by an antenna. In Rx, the signal is first received by the antenna, is amplified with a low noise figure using an LNA, then the amplified signal is modulated by a varactor. This improves the noise figure as the lossy element (varactor) is after the LNA.

Embodiments with low reflection loss described herein have one or more of the following improvements: in the transmit (Tx) side: low mutual coupling between antenna and waveguide, and high efficiency; and in the receive (Rx) side: very low noise figure, low mutual coupling between antenna, and waveguide, and high efficiency.

In some embodiments, the unit cells include: a tunable coupler, an LNA/PA with their matching circuits, an antenna, and a WAIM. The coupler tunes the magnitude and phase of the signal coming from waveguide (in Tx) or from antenna/LNA (in Rx). The PA (in Tx) amplifies the signal with a high gain and high power-added efficiency. In Rx, the LNA amplifies signal with low-noise performance and moderate gain. The antenna transmits/receives the signal in Tx/Rx modes, respectively. The WAIM also improves efficiency by converting the impedance of the free space to an impedance that can be better matched with the impedance of the antenna. The WAIM also improves the performance of the metasurface for the wide scans.

Figure 11A:
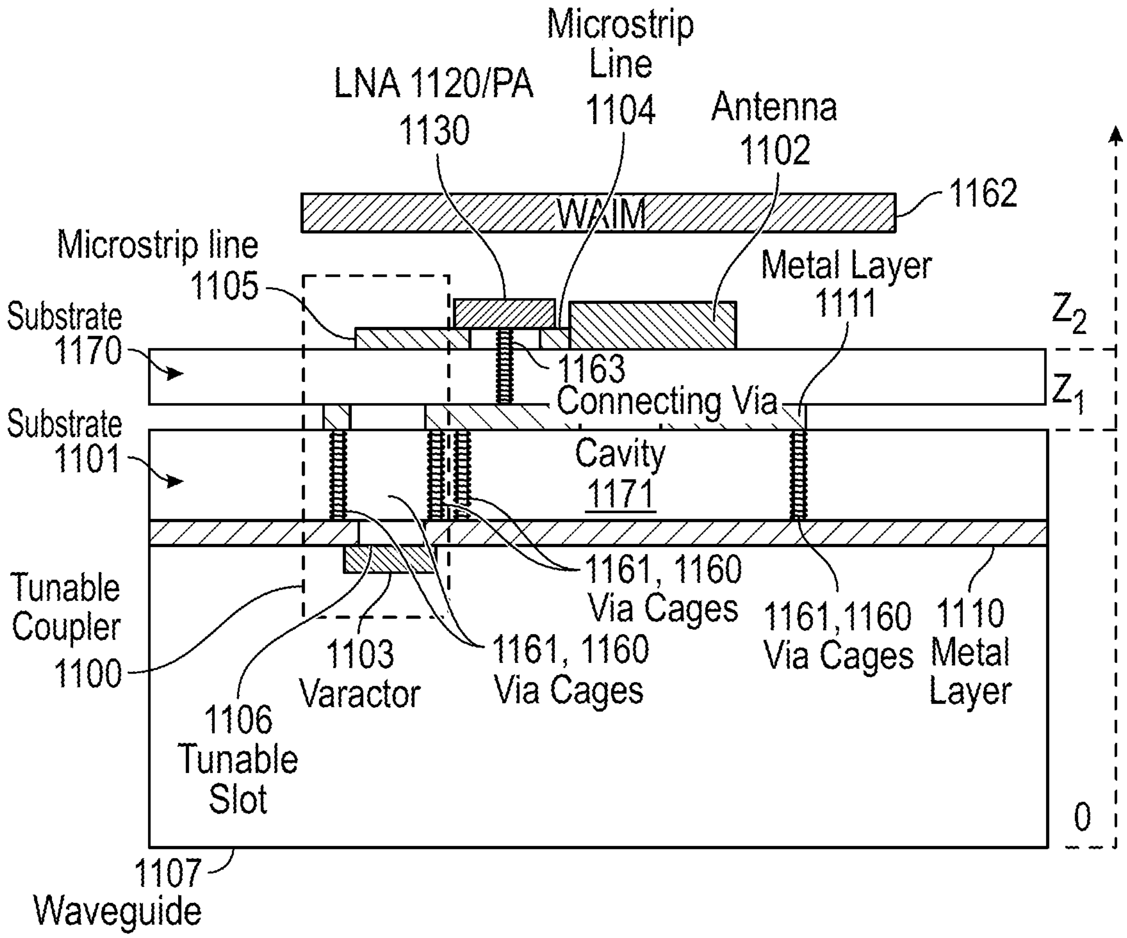
FIGS. 11A-11C illustrate top and side views of some embodiments of a unit cell of a metasurface structure.
Figure 11B:
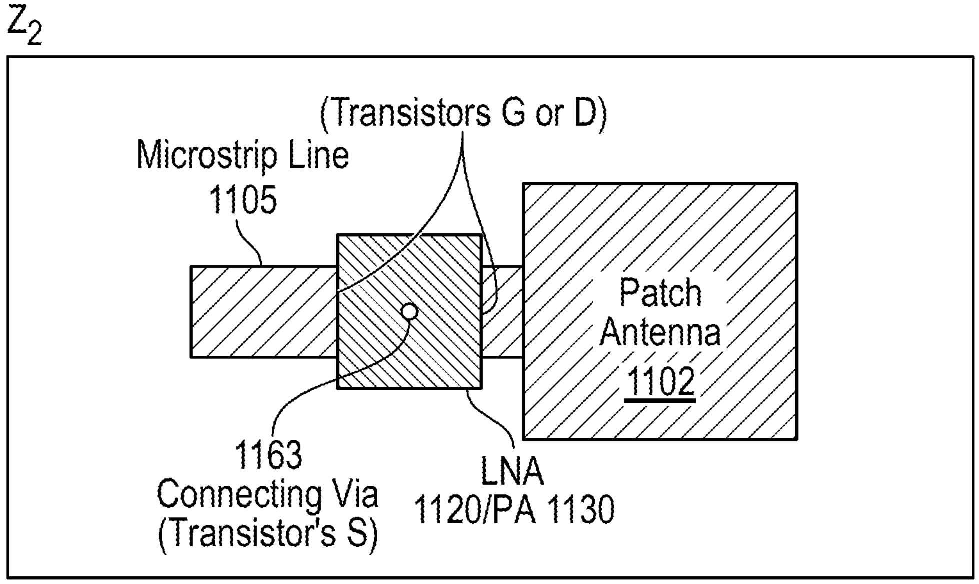
Figure 11C:
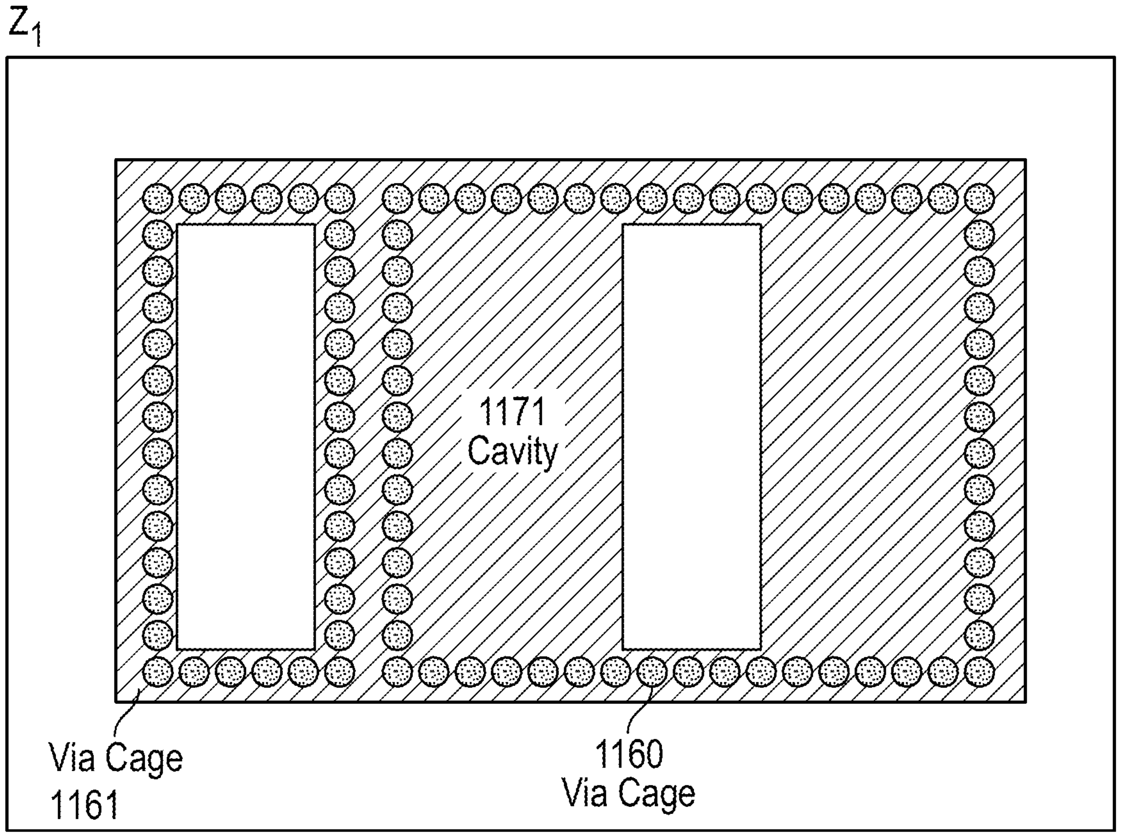

FIGS. 11A-11C illustrate some embodiments of top and side views of a unit cell of the metasurface structure. The top views are shown at different layers (Z1 and Z2). The disclosed structure of FIGS. 11A-11C includes a tunable slot, which is part of a tunable coupler, a cavity, an LNA/PA (for receive/transmit), a patch antenna, and a WAIM. In some embodiments of this configuration, the radiation part (antenna and cavity created by the via (e.g., wire) cage) is separated from waveguide section, which achieves a stable high gain. The stability would be unconditional as the coupling between input and output of the PA/LNA would be significantly low.

FIGS. 11A and 11B illustrate top and side views of some embodiments of a unit cell of the metasurface structure. Referring to FIGS. 11A and 11B, a waveguide 1107 propagates a feed wave to the metasurface structure. Metal layer 1110 is coupled to waveguide 1107 and includes a tunable slot 1106. Substrate 1101 is coupled to the top of metal layer 1110. Metal layer 1111 is coupled to the top of substrate 1101 and includes a slot over tunable slot 1106 as well a gap over cavity 1171, which is the cavity that together with antenna 1102 forms a cavity-backed antenna. Metal layer 1111 is coupled to metal layer 1110 by two via (wire) cages 1160 and 1161 that each comprise multiple vias (conductors (e.g., wires). Via cage 1161 is part of tunable coupler 1100. Via cage 1160 is the sides around cavity 1171. Substrate 1170 is coupled to the top of metal layer 1111. Microstrip (or other transmission line) 1105 is coupled to the top of substrate 1170 and is coupled to LNA 1120/PA 1130. LNA 1120/PA 1130 is coupled to metal layer 1111. In some embodiments, LNA 1120/PA 1130 is electrically connected to metal layer 1111 using a connecting via 1163 (or other conductor). LNA 1120/PA 1130 is coupled to antenna 1102 using microstrip 1104 that is coupled to the top of substrate 1170. Note that while shown together in FIGS. 11A and 11B for convenience, LNA 1120 and PA 1130 are separate electronic components.

The metasurface structure includes a varactor (or other tuning element) 1103, a tunable slot 1106, which is part of tunable coupler 1100, LNA 120/PA 1130, antenna 1102 with cavity 1171 formed by via cage 1160, and a WAIM 1162. In some embodiments, antenna 1102 comprises a patch antenna.

When operating, an incoming signal is received by antenna 1102 that is attached to substrate 1170. At this point, there is no modulation (e.g., amplitude and/or phase shifting for beamforming) applied to the received signal. In some other embodiments, other types of radiating antenna elements can be used. The received signal is then carried via microstrip line 1104 (or some other transmission line (e.g., CPW, etc.)) attached to substrate 1101 to LNA 1120, where the received signal is amplified. A microstrip line 1105 (or other transmission line) attached to substrate 1101 carries the amplified signal from LNA 1120 and then its energy couples via tunable (coupling) element/slot 1106 in metal layer 1110 to waveguide 1107. At this stage, while the amplified received signal is being coupled to waveguide 1107, modulation (e.g., hologram modulation) is applied and its phase and/or amplitude are adjusted for beamforming using a tuning element coupled across, and loading, tunable slot 1106. In some embodiments, the tuning element is a varactor 1103, and this architecture assumes that the varactor in every unit cell can be controlled individually. Thus, varactor 1103 (or another type of tuning element) is able to tune the impedance to cause a phase shift to the signal to implement modulation. The hologram is created at the coupling layer and not the radiating element.

During transmit, a wave propagates through waveguide 1107 to tunable slot 1106, where it's phase-shifted as its being coupled to microstrip 1105 via tunable slot 1106. Varactor 1103 is tuned to apply modulation to the transmit signal (e.g., creating a hologram at the coupling layer and not the radiating element). The modulated signal is coupled to microstrip 1105 and proceeds through PA 1130 where the transmit signal is amplified and then passed to antenna 1102, via microstrip line 1104, where antenna 1102 radiates the transmit signal. Note that while shown together in FIGS. 11A and 11B for convenience, LNA 1120 and PA 1130 are separate electronic components.

In this configuration, the radiation part of the metasurface is separated from waveguide 1107, thereby achieving a stable high gain. The stability would be unconditional as the coupling between input and output of PA 1130/LNA 1120 would be significantly low. One other advantage of this configuration is that the coupler does not radiate due to having a via (wire) cage 1161 with multiple vias (wires). Via cage 1161 is designed to reduce, and potentially avoid, radiation from coupler 1100 interfering with patch antenna 1102. In some embodiments, the spacing between vias in via cage 1161 is not greater than the diameter or thickness of the via itself.

One of other features of this structure is its low reflection. By creating a cavity-shaped coupler, in Tx mode, the reflection toward the waveguide in the iris transition can be reduced. The lower reflection toward the waveguide in turn yields higher efficiency in both Tx and Rx. The cavity under the patch antenna helps to match the antenna and increase the radiation efficiency.

Due to size restriction, the antenna would be electrically small which results in having a low radiation resistance. In some embodiments, the electrically small antenna is designed to provide greater possible radiation resistance, thereby increasing the efficiency. As varactor 1103 is placed after the LNA 1120 in receive (Rx) mode, the noise figure of this structure would be very low.

Figure 12A:
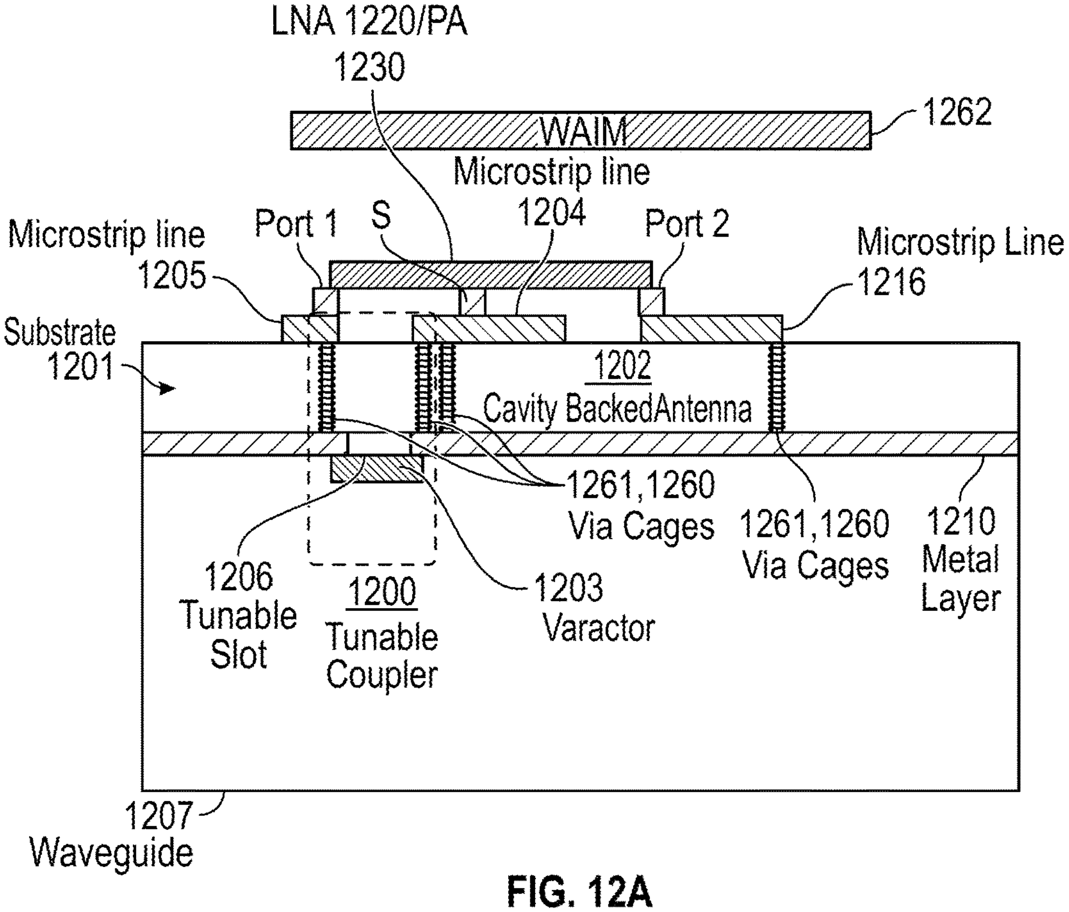
FIGS. 12A and 12B illustrate top and side views of some embodiments of a modified version of the unit cell in FIGS. 11A-11C.
Figure 12B:
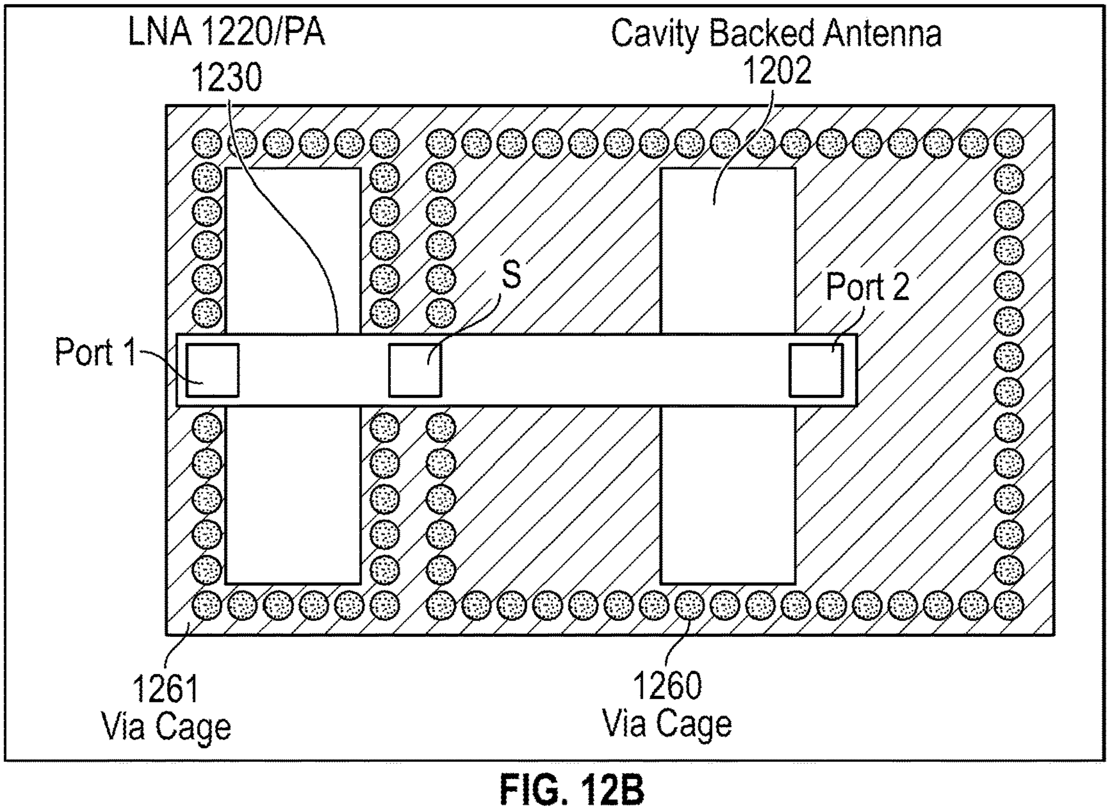

FIGS. 12A and 12B illustrate top and side views of some embodiments of a modified version of the unit cell in FIGS. 11A-11C. In this case, a patch antenna is not part of the antenna element. Referring to FIGS. 12A and 12B, a waveguide 1207 propagates a feed wave to the metasurface structure. Metal layer 1210 is coupled to waveguide 1207 and includes a tunable slot 1206. Substrate 1201 is coupled to the top of metal layer 1210. Microstrip lines (or other transmission lines) 1204, 1205, and 1216 are coupled to the top of substrate 1201 and is coupled to LNA 1220/PA 1230.

Microstrip lines 1204 and 1205 form a slot at the top of tunable slot 1206. Microstrip lines 1204 and 1216 form a gap over a cavity for cavity-backed antenna 1202. Microstrip lines 1204 and 1216 are coupled by via (wire) walls, which each comprise multiple vias (e.g., conductors (e.g., wires)), to metal layer 1210, forming via cage 1260. The cavity for cavity-back antenna 1202 is formed by metal layer 1210, via cage 1260, and microstrip lines 1204 and 1216. Microstrip lines 1204 and 1205 are coupled to metal layer 1210 by via (wire) cage 1261 that comprises multiple vias (conductors (e.g., wires). Via cage 1261 is part of tunable coupler 1200. Microstrip lines (or other transmission lines) 1204, 1205, and 1216 are also coupled to LNA 1220/PA 1230 using Port 1, a source (S) and Port 2, respectively, for coupling to cavity-backed antenna 1202. Note that while shown together in FIGS. 12A and 12B for convenience, LNA 1220 and PA 1230 are separate electronic components.

The metasurface structure includes a tunable slot 1206 (which is part of tunable coupler 1200), a varactor (or another type of tuning element) 1203 coupled across tunable slot 1206, LNA 1220/PA 1230, antenna 1202 with cavity formed by via cage 1260, and a WAIM 1262.

To lower the cost, LNA 1220/PA 1230 in some embodiments can be directly connected or coupled to the center of the slots on the top layer. While LNA 1220/PA 1230 is shown directly coupled centrally with respect to the cavity-backed antenna in FIG. 12B, this is not required, and its location can be shifted to, for example, change the matching for LNA 1220/PA 1230.

In some embodiments, in Tx mode (when transmitting signal), the gate and drain ports of the PA (along with their matching circuitries) will be connected to Port 1 and Port 2, respectively. The source (S) will be the ground. When the open-ended slot on top of coupler 1200 is excited in Tx mode (from a feed wave that propagates from waveguide 1207 through tunable coupler 1200, there would be a small voltage difference between gate (Port 1) and source (S) of PA 1230. This voltage would be amplified and gets across the slot over the cavity to excite cavity-backed antenna 1202.

In some embodiments, in Rx mode (when receiving a signal), the gate and drain ports of the LNA 1220 (along with their matching circuitries) is connected or coupled to Port 2 and Port 1, respectively. Voltage across cavity-backed antenna 1202 will be amplified with low noise and the amplified signal gets across the open-ended slot on top of coupler 1200. This signal will be transmitted to waveguide 1207 through coupler 1200. Since the antenna used here is a cavity-backed antenna, there is no back radiation toward waveguide 1207. This significantly reduces reflection loss which is advantageous when the gain of LNA 1220 is high.

Note that while not shown in FIGS. 12A and 12B, in some embodiments, the gate (G) is coupled to, or otherwise represents, the input and the drain (D) is coupled to, or otherwise represents, the output, while the source (S) is coupled to a common ground plane. An example of this arrangement is shown in FIGS. 14A and 14B described in more detail below.

Figure 13A:
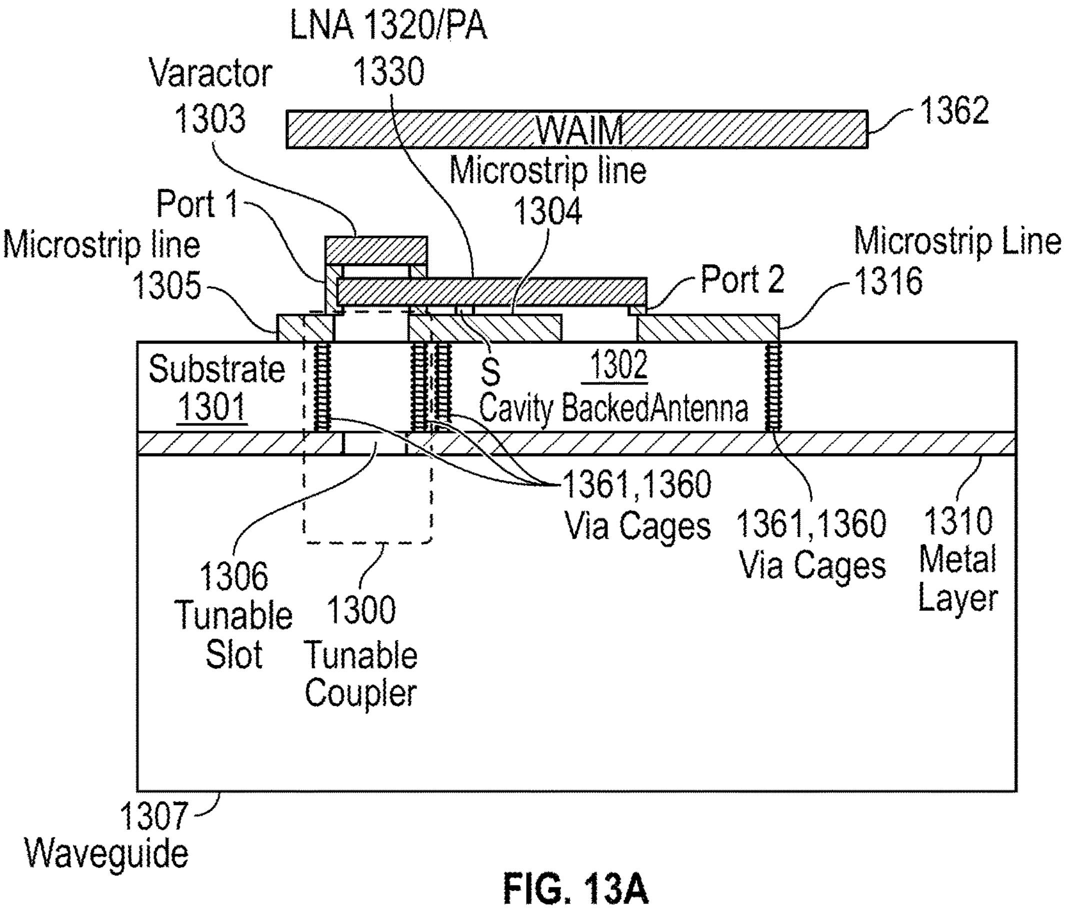
FIGS. 13A and 13B illustrate side and top views of some embodiments of radiating antenna element with an integration of a varactor with an LNA/PA
Figure 13B:
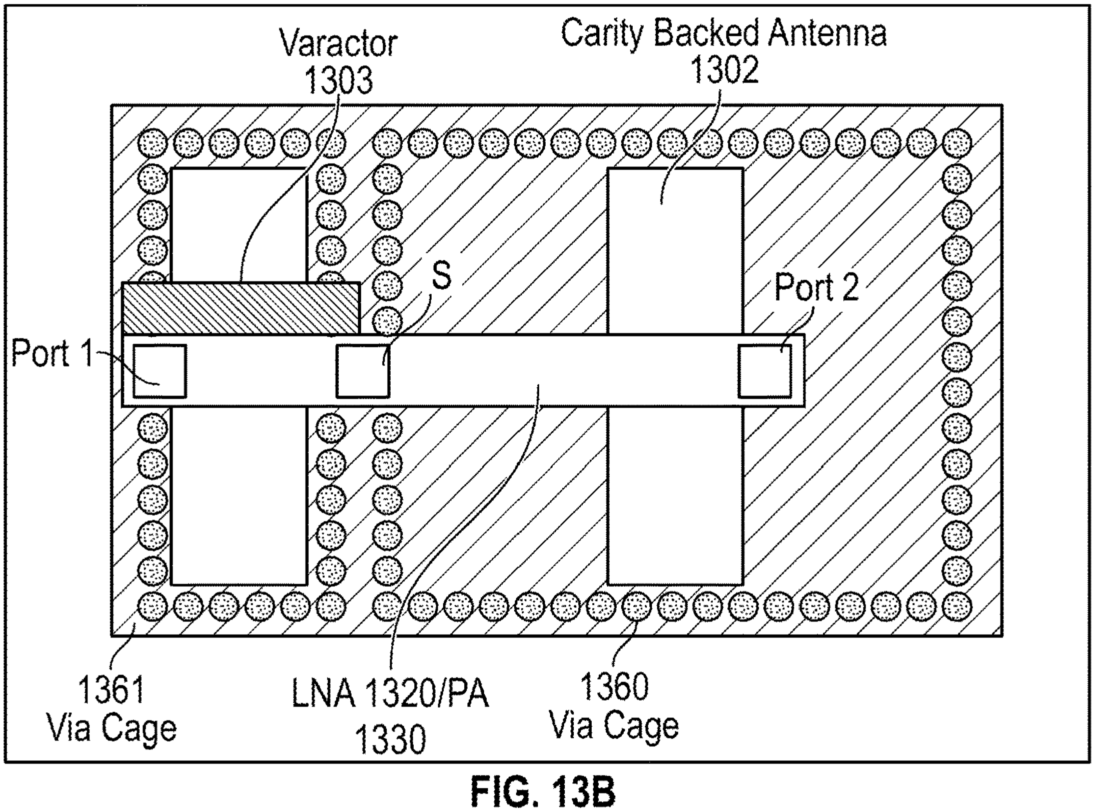

FIGS. 13A and 13B illustrate side and top views of some embodiments of radiating antenna element with an integration of a varactor with an LNA/PA to further lower the cost. Referring to FIGS. 13A and 13B, a waveguide 1307 propagates a feed wave to the metasurface structure. Metal layer 1310 is coupled to waveguide 1307 and includes a tunable slot 1306. Substrate 1301 is coupled to the top of metal layer 1310. Microstrip lines (or other transmission lines) 1304, 1305, and 1316 are coupled to the top of substrate 1301 and is coupled to LNA 1320/PA 1330. Microstrip lines 1304 and 1305 form a slot at the top of tunable slot 1106. Microstrip lines 1304 and 1316 form a gap over a cavity for cavity-backed antenna 1302. Microstrip lines 1304 and 1316 are coupled by via (wire) walls, which each comprise multiple vias (conductors (e.g., wires), to metal layer 1310, forming via cage 1360. The cavity for cavity-back antenna 1302 is formed by metal layer 1310, via cage 1360, and microstrip lines 1304 and 1316. Microstrip lines 1304 and 1305 are coupled to metal layer 1310 by via (wire) cage 1361 that comprises multiple vias (conductors (e.g., wires). Via cage 1361 is part of tunable coupler 1300. Microstrip lines (or other transmission lines) 1304, 1305, and 1316 are also coupled to LNA 1320/PA 1330 using port 1, a source (s) and port 2, respectively, for coupling to cavity-backed antenna 1302.

The metasurface structure includes a tunable slot 1306 (which is part of tunable coupler 1300), a varactor (or another type of tuning element) 1303 coupled across tunable slot 1306, LNA 1320/PA 1330, antenna 1302 with cavity formed by via cage 1360, and a WAIM 1362. Note that while shown together in FIGS. 13A and 13B for convenience, LNA 1320 and PA 1330 are separate electronic components in some embodiments. In some embodiments of this configuration (as opposed to the configuration of FIGS. 12A and 12B), the radiating antenna element/unit cell operates as the radiating antenna element/unit cell with varactor 1303 still tuning the reactance across the tunable slot (iris) 1306. In some embodiments, varactor 1303 and LNA 1320/PA 1330 can be designed together in a single die to shrink its size and reduce the price. This will also reduce the losses, increases the efficiency and improves the noise figure (in Rx). This configuration would be cost effective as it is designed on PCB (substrate 1301) with LNA 1320/PA 1330 and varactor 1303 integrated together. Additionally, the reflection loss would be very low as the cavity-backed antenna 1302 operates to keep the radiation from radiating backwards.

Figure 14A:
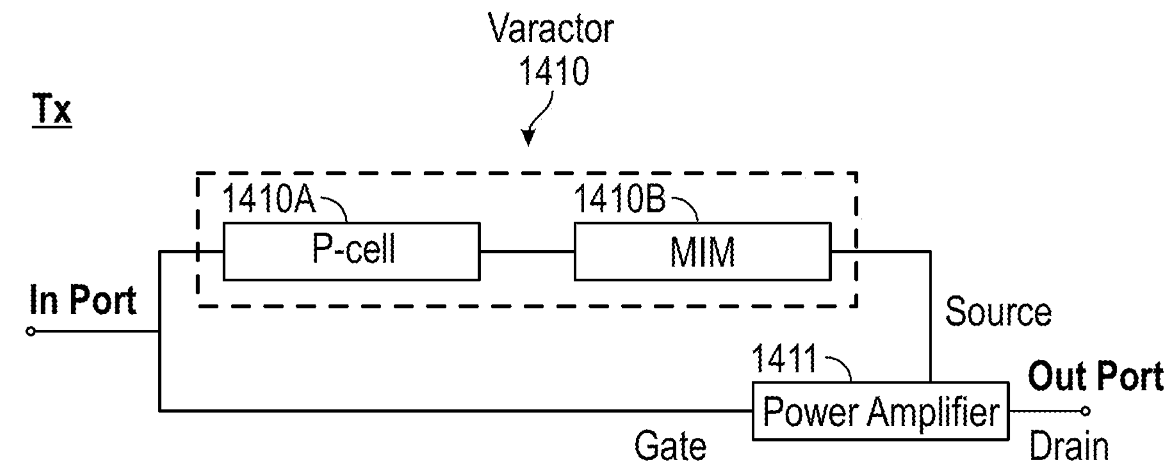
FIGS. 14A and 14B are block diagrams of some embodiments of a single die varactor that can be used in the metasurface configuration.
Figure 14B:
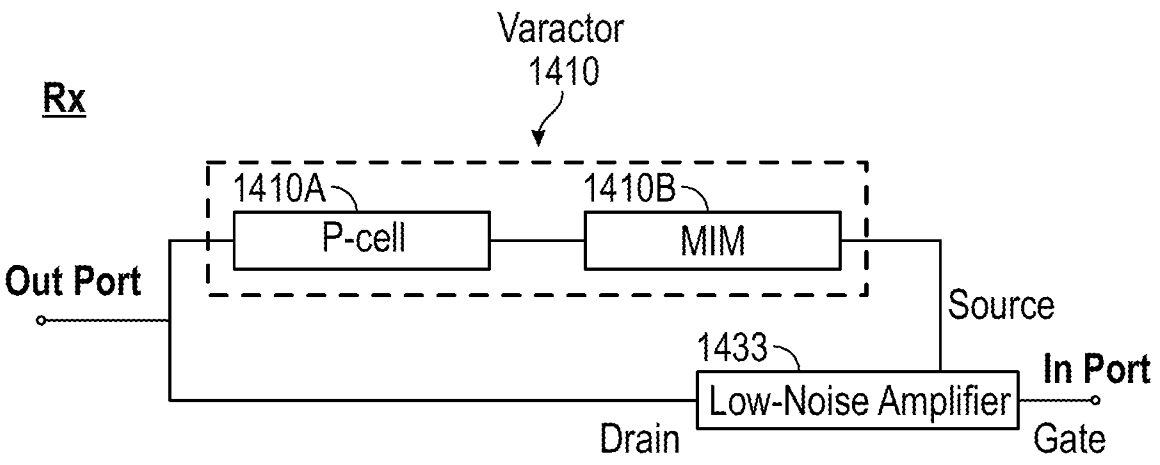

FIGS. 14A and 14B are block diagrams of some embodiments of a single die varactor that can be used in the metasurface configuration (e.g., FIGS. 13A and 13B). Referring to FIGS. 14A and 14B, varactor 1410 is integrated between the gate and source of the power amplifier 1411 in Tx mode and between the drain and source of low-noise amplifier 1433 is Rx mode. The integration of these two components can yield significant cost reduction. In some embodiments, varactor 1410 comprises a tunable P-cell 1410A (e.g., PIN diode, p-n junction) and a MIM Metal-Insulator-Metal) capacitor 1410B.

Thus, active metasurface embodiments with low reflection loss described herein can have one or more of the following advantages: very significantly low reflection loss, low noise figure and moderate to high gain in Rx, high gain with unconditional stability in Tx, high efficiency, great tunability, and compatible with the PCB design process for low-cost design. There is a number of example embodiments described herein.

Example 1 is an antenna comprising: a metasurface having a plurality of tunable radiating antenna elements. Each tunable radiating antenna element of the tunable radiating antenna elements comprises: a gap, a pair of conductors positioned in the gap, a transistor coupled to the pair of conductors, a tuning element configured to tune said each tunable radiating antenna element, a capacitor coupled in series with the tuning element, and an amplifier coupled in parallel to the tuning element and the capacitor, wherein first terminals of the tuning element and amplifier are coupled to a first terminal of the transistor and the capacitor and an output terminal of the amplifier are coupled to a second terminal of the transistor.

Example 2 is the antenna of example 1 that may optionally include that the plurality of tunable radiating antenna elements in the metasurface are in a single layer.

Example 3 is the antenna of example 1 that may optionally include that the gap comprises a slot.

Example 4 is the antenna of example 3 that may optionally include that the slot comprises a folded slot.

Example 5 is the antenna of example 4 that may optionally include that the transistor is a field effect transistor (FET) having a gate, a source, and a drain, with the gate and the drain being coupled to opposite sides of the slot and the source being coupled to the pair of conductors of the folded slot.

Example 6 is the antenna of example 4 that may optionally include that the transistor is a bipolar junction transistor (BJT) having a base, an emitter, and a collector, with the base and the collector being coupled to opposite sides of the slot and the emitter being coupled to the pair of conductors of the folded slot.

Example 7 is the antenna of example 1 that may optionally include that the tuning element comprises a varactor.

Example 8 is the antenna of example 1 that may optionally include that the capacitor comprises a MIM capacitor.

Example 9 is the antenna of example 1 that may optionally include that the tuning element, the capacitor and the amplifier are part of a single die.

Example 10 is the antenna of example 9 that may optionally include that the slot has a length and a width, and the single die is coupled across the width of the slot at a central portion along the length thereof.

Example 11 is the antenna of example 9 that may optionally include that the slot has a length and a width, and the single die is coupled across its width at a position that is offset from a central portion of its length.

Example 12 is an antenna comprising: a metasurface having a plurality of tunable radiating antenna elements. Each tunable radiating antenna element of the tunable radiating antenna elements comprises: a folded slot, first and second pairs of conductors positioned in the slot, wherein a gap exists in the slot between the first and second pairs of conductors; a first transistor coupled to the first pair of conductors; a second transistor coupled to the second pair of conductors; a first die coupled across the first slot and to the first transistor, where the first die includes: a first tuning element configured to tune said each tunable radiating antenna element, a first capacitor coupled in series with the first tuning element, and a first amplifier coupled in parallel to the first tuning element and the first capacitor; and a second die coupled across the first slot and to the second transistor, where the second die includes: a second tuning element to tune said each tunable radiating antenna element, a second capacitor coupled in series with the second tuning element, and a second amplifier coupled in parallel to the second tuning element and the second capacitor.

Example 13 is the antenna of example 12 that may optionally include that the first transistor comprises a field effect transistor (FET) having a first gate, a first source, and a first drain, with the first gate and the first drain being coupled to opposite sides of the slot and the first source coupled to the first pair of conductors of the folded slot, and further wherein the second transistor comprises a FET having a second gate, a second source, and a second drain, with the second gate and the second drain being coupled to opposite sides of the slot and the second source being coupled to the second pair of conductors of the folded slot.

Example 14 is the antenna of example 13 that may optionally include that a gate of the first amplifier has a first input and a first output coupled to the first gate and the first drain of the first transistor, respectively, and the second amplifier has a second input and a second output coupled to the second gate and the second drain of the second transistor, respectively.

Example 15 is the antenna of example 12 that may optionally include that the first and second transistors are bipolar junction transistors (BJTs). wherein the first transistor comprises a bipolar junction transistor (BJT) having a first base, a first emitter, and a first collector, with the first base and the first collector being coupled to opposite sides of the slot and the first emitter coupled to the first pair of conductors of the folded slot, and further wherein the second transistor comprises a BJT having a second base, a second emitter, and a second collector, with the second base and the second collector being coupled to opposite sides of the slot and the second emitter being coupled to the second pair of conductors of the folded slot.

Example 16 is an antenna comprising: a metasurface having radiating antenna elements and amplifiers configured to amplify signals for the radiating antenna elements. For each of the radiating antenna elements, the metasurface includes: an antenna element; at least one of: a low noise amplifier (LNA) coupled to the patch antenna and configured to amplify signals after reception by the patch antenna for said each radiating antenna element, and a power amplifier (PA) coupled to the patch antenna and configured to amplify signals for transmission from the one radiating antenna element by the patch antenna; a tunable coupler coupled to the patch antenna using a wire cage. The coupler includes a tunable slot to couple a feed wave to said each radiating antenna element, and a tuning element coupled to the tunable slot to tune said tunable slot.

Example 17 is the antenna of example 16 that may optionally include that the wire cage comprises a via cage with a plurality of vias.

Example 18 is the antenna of example 16 that may optionally include that the antenna element is electrically shorted to a ground plane.

Example 19 is the antenna of example 18 that may optionally include that the antenna element is electrically shorted to a ground plane using a second plurality of vias.

Example 20 is the antenna of example 16 that may optionally include that the first plurality of vias traverse a substrate and are coupled to a first side of a conductive layer containing the slot to one or more transmission line, the conductive layer being coupled to one side of the substrate and the one or more transmission line being coupled to a second side of the substrate opposite the first side of the substrate.

Example 21 is the antenna of example 20 that may optionally include that the tuning element is coupled across the slot on a second side of the conductive layer that is opposite the first side of the conductive layer.

Example 22 is the antenna of example 20 that may optionally include that the tuning element is over the second side of the substrate and coupled to at least one of the one or more transmission line at a position that is over and across the slot.

Example 23 is the antenna of example 22 that may optionally include that the tuning element is coupled to the conductive layer using vias within the wire cage.

Example 24 is the antenna of example 20 that may optionally include that the conductive layer is a ground layer.

Example 25 is the antenna of example 16 that may optionally include that the tuning element comprises a varactor.

Example 26 is the antenna of example 25 that may optionally include that the LNA is coupled between the varactor and the patch antenna.

Example 27 is the antenna of example 26 that may optionally include that the varactor is in a die with one or both of the LNA and the PA.

Example 28 is an antenna comprising: a metasurface having a plurality of radiating antenna elements. Each of the plurality of radiating antenna elements comprises: a cavity-backed antenna; at least one of: a low noise amplifier (LNA) coupled to the cavity-backed antenna and configured to amplify signals after reception by the cavity-backed antenna for said each radiating antenna element, and a power amplifier (PA) coupled to the cavity-backed antenna and configured to amplify signals for transmission from the one radiating antenna element by the cavity-backed antenna; and a tunable coupler coupled to the cavity-backed antenna using a first wire cage having a first plurality of vias. The tunable coupler includes a tunable slot to couple a feed wave to said each radiating antenna, element, and a tuning element coupled to the tunable slot to tune the tunable slot.

Example 29 is the antenna of example 28 that may optionally include that the first wire cage comprises a plurality of vias.

Example 30 is the antenna of example 28 that may optionally include that the cavity-backed antenna comprises a cavity formed by a second wire cage.

Example 31 is the antenna of example 30 that may optionally include that the second wire cage comprises a plurality of vias.

Example 32 is the antenna of example 28 that may optionally include that the first plurality of vias traverse a substrate and couple a first side of a conductive layer containing the slot to one or more transmission lines, the conductive layer coupled to one side of the substrate and the one or more transmission lines coupled to a second side of the substrate opposite the first side of the substrate, and further wherein the tuning element is coupled across the slot on a second side of the conductive layer that is opposite the first side of the conductive layer.

Example 33 is the antenna of example 32 that may optionally include that the first plurality of vias traverse a substrate and couple a first side of a conductive layer containing the slot to one or more transmission lines, the conductive layer coupled to one side of the substrate and the one or more transmission lines coupled to a second side of the substrate opposite the first side of the substrate, and one or both of the LNA and the PA is over the second side of the substrate and connected to at least one of the one or more transmission lines at a position that is over and across the slot.

Example 34 is the antenna of example 33 that may optionally include that the tuning element is over the one or both of the LNA and the PA and is over the second side of the substrate and over and across the slot.

Example 35 is the antenna of example 28 that may optionally include that the tuning element comprises a varactor.

Example 36 is the antenna of example 35 that may optionally include that the varactor comprises a tunable P-cell and is coupled to a capacitor.

Example 37 is the antenna of example 28 that may optionally include that the capacitor comprises a Metal-Insulator-Metal (MIM) capacitor.

Methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. An antenna comprising:
- a metasurface having a plurality of tunable radiating antenna elements, wherein each tunable radiating antenna element of the tunable radiating antenna elements comprises:
  - a gap,
  - a pair of conductors positioned in the gap,
  - a transistor coupled to the pair of conductors,
  - a tuning element configured to tune said each tunable radiating antenna element,
  - a capacitor coupled in series with the tuning element, and
  - an amplifier coupled in parallel to the tuning element and the capacitor, wherein first terminals of the tuning element and amplifier are coupled to a first terminal of the transistor and the capacitor and an output terminal of the amplifier are coupled to a second terminal of the transistor.

2. The antenna of claim 1 wherein the plurality of tunable radiating antenna elements in the metasurface are in a single layer.

3. The antenna of claim 1 wherein the gap comprises a slot.

4. The antenna of claim 3 wherein the slot comprises a folded slot.

5. The antenna of claim 4 wherein the transistor is a field effect transistor (FET) having a gate, a source, and a drain, with the gate and the drain being coupled to opposite sides of the slot and the source being coupled to the pair of conductors of the folded slot.

6. The antenna of claim 4 wherein the transistor is a bipolar junction transistor (BJT) having a base, an emitter, and a collector, with the base and the collector being coupled to opposite sides of the slot and the emitter being coupled to the pair of conductors of the folded slot.

7. The antenna of claim 1 wherein the tuning element comprises a varactor, the capacitor comprises a MIM capacitor, and the tuning element, the capacitor and the amplifier are part of a single die.

8. The antenna of claim 1 wherein the tuning element comprises a varactor.

9. The antenna of claim 1 wherein the capacitor comprises a MIM capacitor.

10. The antenna of claim 7 wherein the slot has a length and a width, and the single die is coupled across the width of the slot at a central portion along the length thereof.

11. The antenna of claim 7 wherein the slot has a length and a width, and the single die is coupled across its width at a position that is offset from a central portion of its length.

12. An antenna comprising:
- a metasurface having a plurality of tunable radiating antenna elements, wherein each tunable radiating antenna element of the tunable radiating antenna elements comprises:
  - a folded slot,
  - first and second pairs of conductors positioned in the slot, wherein a gap exists in the slot between the first and second pairs of conductors;
  - a first transistor coupled to the first pair of conductors;
  - a second transistor coupled to the second pair of conductors;
  - a first die coupled across the slot and to the first transistor, where the first die includes:
    - a first tuning element configured to tune said each tunable radiating antenna element, a first capacitor coupled in series with the first tuning element, and a first amplifier coupled in parallel to the first tuning element and the first capacitor; and a second die coupled across the slot and to the second transistor, where the second die includes:

a second tuning element to tune said each tunable radiating antenna element, a second capacitor coupled in series with the second tuning element, and a second amplifier coupled in parallel to the second tuning element and the second capacitor.

13. The antenna of claim 12 wherein the first transistor comprises a field effect transistor (FET) having a first gate, a first source, and a first drain, with the first gate and the first drain being coupled to opposite sides of the slot and the first source coupled to the first pair of conductors of the slot, and further wherein the second transistor comprises a FET having a second gate, a second source, and a second drain, with the second gate and the second drain being coupled to opposite sides of the slot and the second source being coupled to the second pair of conductors of the slot.

14. The antenna of claim 13 wherein a gate of the first amplifier has a first input and a first output coupled to the first gate and the first drain of the first transistor, respectively, and the second amplifier has a second input and a second output coupled to the second gate and the second drain of the second transistor, respectively.

15. The antenna of claim 12 wherein the first and second transistors are bipolar junction transistors (BJTs), wherein the first transistor has a first base, a first emitter, and a first collector, with the first base and the first collector being coupled to opposite sides of the slot and the first emitter coupled to the first pair of conductors of the slot, and further wherein the second transistor comprises has a second base, a second emitter, and a second collector, with the second base and the second collector being coupled to opposite sides of the slot and the second emitter being coupled to the second pair of conductors of the slot.

* * * * *